United States Patent
Beri et al.

(10) Patent No.: US 10,482,577 B2
(45) Date of Patent: Nov. 19, 2019

(54) DYNAMIC SPREAD ANTI-ALIASING

(71) Applicant: Adobe Inc., San Jose, CA (US)

(72) Inventors: Tarun Beri, Noida (IN); Vineet Batra, Pitam Pura (IN); Harish Kumar, Mahendergarh (IN)

(73) Assignee: Adobe Inc., San Jose, CA (US)

( * ) Notice: Subject to any disclaimer, the term of this patent is extended or adjusted under 35 U.S.C. 154(b) by 39 days.

(21) Appl. No.: 15/220,834

(22) Filed: Jul. 27, 2016

(65) Prior Publication Data
US 2018/0033168 A1    Feb. 1, 2018

(51) Int. Cl.
*G09G 5/00* (2006.01)
*G06T 3/40* (2006.01)
*G06T 11/40* (2006.01)

(52) U.S. Cl.
CPC ............ *G06T 3/4084* (2013.01); *G06T 11/40* (2013.01)

(58) Field of Classification Search
None
See application file for complete search history.

(56) References Cited

U.S. PATENT DOCUMENTS

| | | | | |
|---|---|---|---|---|
| 5,982,384 A | * | 11/1999 | Prouty | G06T 11/40 345/441 |
| 6,515,668 B1 | * | 2/2003 | Bruijns | G06T 13/20 345/473 |
| 6,577,307 B1 | * | 6/2003 | Hsiao | G06T 15/503 345/421 |
| 7,567,248 B1 | * | 7/2009 | Mark | G06T 11/40 345/426 |
| 7,605,825 B1 | * | 10/2009 | Lau | G06T 11/203 345/428 |
| 7,868,887 B1 | | 1/2011 | Yhann | |
| 7,928,984 B1 | | 4/2011 | Yhann et al. | |
| 7,952,580 B1 | * | 5/2011 | Yhann | G06T 11/203 345/419 |

(Continued)

OTHER PUBLICATIONS

"Barycentric Interpolation", Retrieved at: https://classes.soe.ucsc.edu/cmps160/Fall10/resources/barycentricInterpolation.pdf—on May 20, 2016, 18 pages.

(Continued)

*Primary Examiner* — Anh-Tuan V Nguyen
(74) *Attorney, Agent, or Firm* — SBMC

(57) ABSTRACT

Dynamic spread anti-aliasing is described. In some embodiments, a filled object is segmented into control tiles. Along the object border, multiple exterior control tiles respectively correspond to multiple curves forming the border. For each curve, one side is filled and the other is anti-aliased to smooth the appearance of the filled object. Each exterior control tile is expanded to create an expanded control tile having a spread zone that includes additional pixels. For example, a control triangle is transformed into a control rectangle, and the control rectangle is enlarged to create an expanded control rectangle by extending an edge outward and away from the curve on the side to be anti-aliased. The additional pixels of the spread zone are subjected to anti-aliasing, such as by applying alpha modulation to the pixels based on respective distances between the pixels and the curve. For subpixel zoom levels, pixel color can be adjusted.

20 Claims, 18 Drawing Sheets

(56) References Cited

U.S. PATENT DOCUMENTS

| | | | | |
|---|---|---|---|---|
| 8,035,641 B1* | 10/2011 | O'Donnell | G06T 15/00 | 345/419 |
| 8,044,955 B1* | 10/2011 | Yhann | G06T 17/20 | 345/419 |
| 8,237,710 B1* | 8/2012 | Marketsmueller | G06T 11/203 | 345/419 |
| 8,624,911 B1* | 1/2014 | Miller | G06T 11/40 | 345/581 |
| 2002/0101435 A1* | 8/2002 | Sasaki | G06T 11/40 | 345/611 |
| 2003/0206168 A1* | 11/2003 | Kejser | G06T 11/40 | 345/441 |
| 2003/0210251 A1* | 11/2003 | Brown | G06T 11/203 | 345/611 |
| 2004/0135795 A1* | 7/2004 | Raubacher | G06T 11/40 | 345/611 |
| 2004/0263516 A1* | 12/2004 | Michail | G06T 11/203 | 345/441 |
| 2005/0190179 A1* | 9/2005 | Hong | G06T 11/001 | 345/419 |
| 2005/0206657 A1* | 9/2005 | Arcas | G01C 21/36 | 345/660 |
| 2006/0269116 A1* | 11/2006 | Makarovic | G03F 7/70291 | 382/141 |
| 2007/0046687 A1* | 3/2007 | Soroushi | G06F 3/14 | 345/589 |
| 2007/0070071 A1* | 3/2007 | Terazono | G06K 9/48 | 345/467 |
| 2007/0153022 A1* | 7/2007 | Keshet | G06T 11/203 | 345/611 |
| 2008/0225042 A1* | 9/2008 | Birtwistle | H04N 13/261 | 345/419 |
| 2008/0309676 A1* | 12/2008 | Nehab | G06T 9/00 | 345/582 |
| 2009/0058880 A1* | 3/2009 | Tremblay | G06T 11/203 | 345/611 |
| 2009/0237406 A1* | 9/2009 | Chen | G06T 11/203 | 345/441 |
| 2011/0285736 A1* | 11/2011 | Kilgard | G06T 11/203 | 345/584 |
| 2011/0285747 A1* | 11/2011 | Kilgard | G06T 11/203 | 345/613 |
| 2011/0300936 A1* | 12/2011 | Matsumiya | G06T 15/503 | 463/32 |
| 2012/0069037 A1* | 3/2012 | Ziemski | G06T 11/001 | 345/586 |
| 2014/0125669 A1* | 5/2014 | Kilgariff | G06T 15/005 | 345/426 |
| 2015/0023595 A1* | 1/2015 | Perry | G06T 11/203 | 382/173 |
| 2015/0084981 A1* | 3/2015 | Clarberg | G06T 11/40 | 345/614 |
| 2015/0178961 A1* | 6/2015 | Karras | G06T 11/203 | 345/442 |
| 2016/0364845 A1* | 12/2016 | Sathe | G06T 1/20 | |
| 2016/0379342 A1* | 12/2016 | Lee | G06T 5/002 | 345/611 |
| 2017/0076470 A1* | 3/2017 | Yoo | G06T 11/203 | |

OTHER PUBLICATIONS

"Fragment Shader—Wikipedia", Retrieved at: https://www.opengl.org/wiki/Fragment_Shader—on May 20, 2016, 6 pages.

"Geometry Shader—Wikipedia", Retrieved at: https://www.opengl.org/wiki/Geometry_Shader—on May 20, 2016, 6 pages.

"NV Path Rendering", NVIDIA GameWorks—Retrieved at: https://developer.nvidia.com/nv-path-rendering—on May 20, 2016, 2 pages.

"Tessellation—Wikipedia", Retrieved at: https://www.opengl.org/wiki/Tessellation—on May 20, 2016, 6 pages.

"Vatti clipping algorithm—Wikipedia", Retrieved at: https://en.wikipedia.org/wiki/Vatti_clipping_algorithm—on May 20, 2016, 2 pages.

"Vertex Shader—Wikipedia", Retrieved at: https://www.opengl.org/wiki/Vertex_Shader—on May 20, 2016, 4 pages.

Chan,"Fast Antialiasing Using Prefiltered Lines on Graphics Hardware", Retrieved at: http://people.csail.mit.edu/ericchan/articles/prefilter/, Feb. 28, 2004, 7 pages.

Elber,"Comparing Offset Curve Approximation Methods", IEEE Computer Graphics and Applications archive vol. 17 Issue 3, May 1997, pp. 62-71.

Loop,"Resolution Independent Curve Rendering Using Programmable Graphics Hardware", In Journal of ACM Transactions on Graphics, vol. 24, Issue 3, Jul. 2005, 10 pages.

Nehab,"Random-Access Rendering of General Vector Graphics", ACM Trans. Graphics (SIGGRAPH Asia), 27(5), 2008, Dec. 2008, 10 pages.

* cited by examiner

DYNAMIC SPREAD ANTI-ALIASING

BACKGROUND

Display screens present images in conjunction with televisions, notebook computers, smart phones, virtual or mixed reality gear, and other electronic devices. Many display screens present an image using a two-dimensional grid of picture elements, or pixels, at some native resolution, such as 1920×1080 pixels. Images are therefore formed using a multitude of pixels or points of light that are emitting different colors. These light-emitting pixels are shaped like rectangles. Consequently, rectangular pixels are used to draw both linear curves and non-linear curves that form part of a displayed image. Because of the rectangular shape of pixels and the two-dimensional grid in which pixels are arrayed, vertical and horizontal lines can be presented smoothly on a display screen. Diagonal lines and rounded objects, on the other hand, can appear rough or jagged due to the detectability by the human eye of the rectangular shape of the pixels. This jagged appearance is referred to as being aliased.

Anti-aliasing refers to techniques that reduce, if not eliminate, the jagged appearance. Conventional graphics processing unit (GPU)-based approaches to anti-aliasing are generally dependent upon multisampling in which each pixel is considered to contain "N" subpixels, with "N" being the multisampling factor. To implement multisampled anti-aliasing (MSAA), "N" values are stored for each pixel that is to be displayed, which causes the storage demands for a display screen to increase by "N" times. Furthermore, the size of any associated textures or buffers, like stencil and depth buffers, is also increased by "N" times. This consumes a significant portion of the limited and scarce graphics memory of a computing system. A typical value of the multisampling factor "N" is eight. However, on some of the latest graphics processing hardware, a multisampling factor of 16 is also available, which further doubles the memory requirements for both the display screen and associated textures and buffers.

In addition to adversely impacting memory requirements, multisampling also increases the number of effective pixels that a graphics processing unit (GPU) pipeline has to process. In other words, the number of effective pixels to be processed also grows by "N" times, and rendering performance therefore decreases. The speed at which an image on a display screen can be updated decreases such that the delays become not only apparent to an end-user, but distracting and frustrating as well. Moreover, the extensive use of graphics memory to accommodate the "N" subpixels-per-displayed-pixel prevents an end-user from being able to simultaneously open multiple complicated artworks in a drawing, illustration, or other imaging program—especially if the underlying color space is CMYK, which inherently consumes more memory than an RGB color space. Thus, relying on multisampling to smooth the appearance of an image with anti-aliasing unfortunately increases the demand for expensive graphics memory, limits the number of images that can be accessed simultaneously, and slows graphics processing to a degree that is noticeable by the end-user.

Furthermore, MSAA ceases to function effectively in a subpixel realm. At extreme zoom levels, some curves of an image enter a subpixel realm, which corresponds to when a width of a curve becomes smaller than one pixel at a current zoom display level. In this subpixel realm, MSAA techniques fail and produce images with a poor appearance. One approach to ameliorating the poor appearance involves replicating path geometry several times (e.g., 3-5 times) in the subpixel zoom range and averaging the anti-aliasing data to produce an acceptable appearance. Unfortunately, the increase in the number of geometric paths involved with this approach slows processing to a degree that implementation is unacceptable from a user-satisfaction perspective.

There is another approach in the subpixel realm that first approximates curves to lines and then draws them in anti-aliased manner on a GPU. Unfortunately, the conversion of curves to lines and the use of a specialized technique for the subpixel zoom range—in addition to a technique for the non-subpixel zoom range—breaks resolution independence. This approach also negatively impacts memory consumption because using two techniques involves two different sets of data being resident on the GPU to accommodate when the zoom level changes to and from the subpixel realm. Further, this approach negatively impacts performance because dynamically switching between two techniques, such as by drawing a few paths in displayed artwork with one technique and other paths with another technique, slows the GPU fill rate.

In brief, with conventional anti-aliasing, multisampling is employed to produce multiple subpixels per displayed pixel. With a typical eight-times (8×) multisampling factor, 8× more graphic memory is consumed for a screen buffer, as well as for texture and other supporting buffers. With effectively 8× more pixels to process, the processing time is also significantly increased. Conventional anti-aliasing also uses two different techniques for different zoom ranges: one technique for standard zoom levels and another technique for sub-pixel zoom levels. Employing two different anti-aliasing techniques creates additional problems. For instance, maintaining and processing data for a second approach increases memory requirements and taxes processing resources. Furthermore, transitioning between a standard zoom level and a subpixel realm is not seamless for the end-user experience when different anti-aliasing techniques are used.

Thus, conventional anti-aliasing that is based on multisampling negatively impacts graphics performance and is limited by the demands placed on graphics memory due to the oversampling factor "N." Moreover, conventional approaches that attempt to extend MSAA into the subpixel realm produce additional visual and performance problems that are apparent to an end-user.

SUMMARY

Dynamic spread anti-aliasing is described. In one or more embodiments, anti-aliasing is applied to both linear curves and non-linear curves of displayed images. Such images can be drawn using, for example, Bezier curves. A resolution-independent anti-aliasing technique described herein is applicable to two-dimensional (2-D) vector graphics that are created with stroked or filled Bezier curves. A single-sampled technique includes a dynamic spreading mechanism that generates sufficient pixel coverage on which to perform anti-aliasing around a Bezier curve. Resolution independence can be achieved by dynamically spreading the pixel coverage in an earlier stage of a graphics pipeline (e.g., in a geometry shader of the OpenGL pipeline) that is implemented on a graphics processing unit (GPU). Pixel filtering enables extra pixels generated by a dynamically-established spread zone to be discarded instead of adversely affecting the displayed image. The remaining pixels of the spread zone are alpha modulated for pixel coverage to produce an anti-aliased appearance of the Bezier curves. The anti-aliasing technique is effective at both subpixel zoom ranges and non-subpixel zoom levels.

In example embodiments, a dynamic spread anti-aliasing module performs anti-aliasing over two major phases. In a first phase, a graphics data preparation module converts different types of Bezier paths into quadratic filled Bezier paths. A tessellation module tessellates a quadratic filled Bezier path to produce tessellated tiles that include control tiles for Bezier curves forming the border of the filled Bezier path. The control tiles may comprise one or more types of polygons, such as triangles. An expansion module dynamically establishes a spread zone having an increased pixel coverage around a Bezier curve. To do so, the expansion module expands a control tile to produce an expanded control tile that establishes the spread zone, which includes additional pixels. In other words, the locus of pixels covered by a control polygon is increased by creating an expanded control polygon to thereby establish the spread zone.

The control tile expansion can include a control tile transformation or a control tile enlargement that creates an expanded control tile having new vertices. With a triangular-shaped control tile, for example, the three vertices of the control triangle define a shape and a location of a Bezier curve. A transformation module transforms a control triangle into a control rectangle having the same width and height as the control triangle. An enlargement module extends an edge of the control rectangle outward and away from the corresponding Bezier curve on an anti-aliased side thereof (e.g., on a side opposite the fill) to create an expanded control rectangle. The increased area or coverage of the expanded control rectangle as compared to the original control triangle establishes the spread zone having the additional pixels. The additional pixels are then subject to anti-aliasing for a display of the Bezier curve. However, the new vertices resulting from control tile expansion are addressed first. To handle these new vertices, graphical attributes are extrapolated and texture coordinates are remapped based on the new vertices. For the graphical attribute extrapolation, a vertex updating module may use, for instance, Barycentric extrapolation. For the texture coordinate remapping, the vertex updating module may apply an inverted transformation matrix to the texture coordinates.

In a second phase, an expansion curtailment module controls the impact of a given spread zone on interior filled pixels of other control tiles. Values of pixels in a spread zone that are not within an original control tile are discarded instead of permitting the values to adversely impact the fill values of other control tiles. For the second phase, the display of the image is also tuned to provide the anti-aliased appearance (e.g., in a fragment shader). First, an image tuning module performs alpha modulation for the Bezier curve, including on at least some of the additional pixels of the spread zone. The alpha modulation modifies a transparency value of pixels starting from the curve and moving outward based on respective distances between the curve and individual pixels. Second, the image tuning module performs a color adjustment modulation on curves in the subpixel realm. If a width of a curve is less than the width of a pixel at a current zoom level, the alpha-modulated color of the curve is adjusted based on the stroke width of the curve and the current zoom level. At a subpixel zoom level, the color adjustment typically lightens the color of the curve to provide the illusion or appearance of a thinner curve.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1:
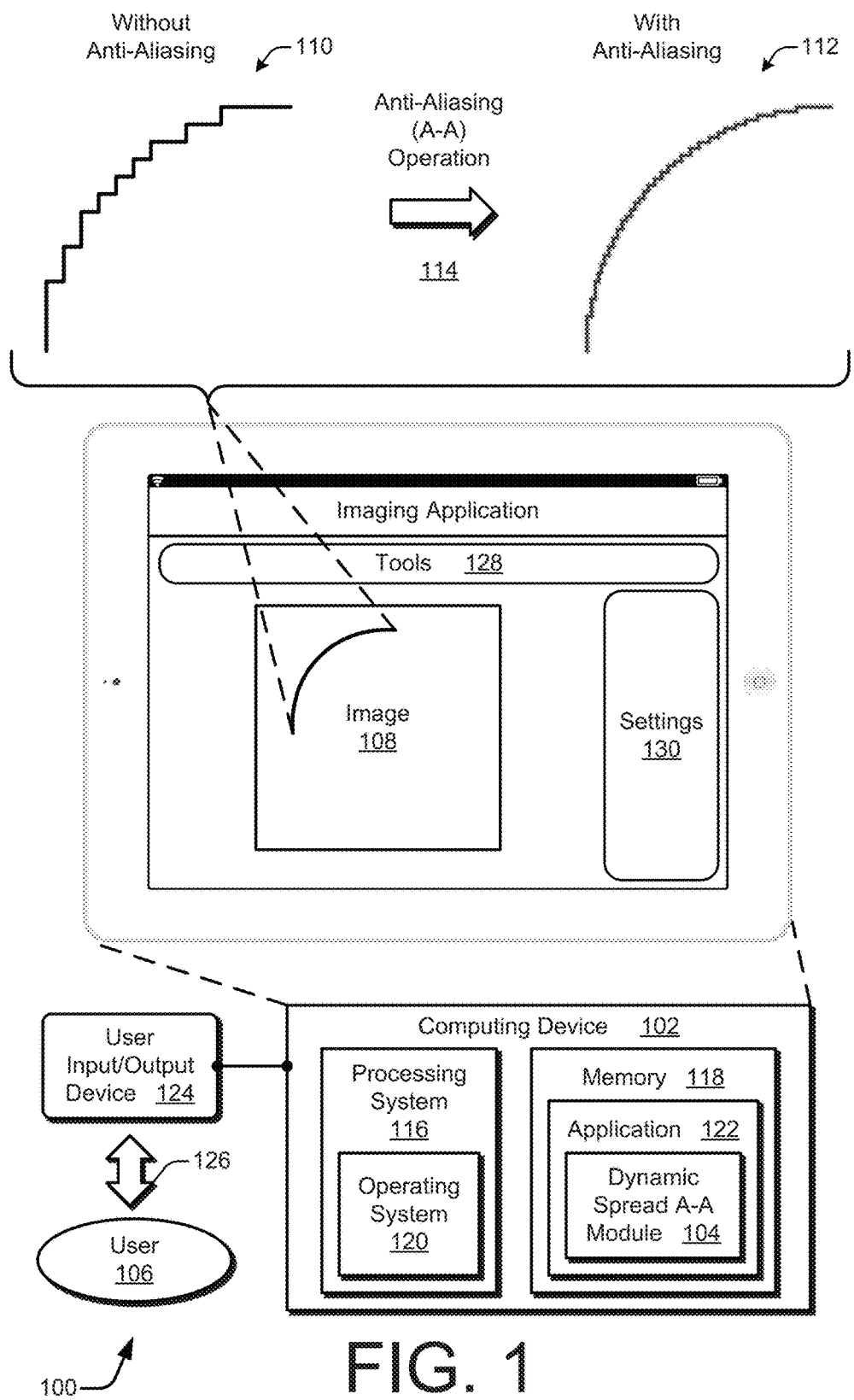
FIG. 1 illustrates an environment for example embodiments that are operable to implement dynamic spread anti-aliasing with a dynamic spread anti-aliasing module.

Dynamic spread anti-aliasing is described herein. In contrast with conventional approaches to anti-aliasing, dynamic spread anti-aliasing provides anti-aliasing of displayed images without relying on multisampling. A single sampling technique performs alpha modulation on displayed pixels while dramatically reducing memory requirements by obviating the storage of data for multiple subpixels per displayed pixel. Dynamic spread anti-aliasing is also applicable to both standard zoom levels and subpixel zoom levels. Thus, a second set of graphics data need not be maintained for subpixel zoom levels. Instead, a color adjustment to displayed pixels is implemented for subpixel zoom levels in conjunction with the alpha modulation.

Dynamic spread anti-aliasing is applicable to linear curves and non-linear curves. The non-linear curves can be realized using Bezier curves of quadratic or higher levels, with the curves having a convex side and a concave side. The Bezier curve is a mathematical construct that enables a curve to be scalable to many different resolutions or displayed zoom levels thereof. Within a given image, multiple Bezier curves are typically interconnected to form a Bezier path. A given Bezier path may be displayed as a filled Bezier path or a stroked Bezier path. Dynamic spread anti-aliasing can be applied, for example, to filled Bezier paths in an anti-aliasing pipeline that is overlaid on a larger graphics pipeline, such as the OpenGL pipeline.

In some embodiments, a dynamic spread anti-aliasing module implements multiple stages of the anti-aliasing pipeline, which includes up to nine stages. Generally, the dynamic spread anti-aliasing module obtains a control triangle associated with a curve that has a fill side and a non-fill side. The control triangle is produced as a result of the second and third stages of the anti-aliasing pipeline. As part of the fourth stage, the dynamic spread anti-aliasing module establishes a spread zone that includes additional pixels by expanding the control triangle on the non-fill side of the curve. In the eighth stage of the anti-aliasing pipeline, the dynamic spread anti-aliasing module generates anti-aliased pixels for the curve by anti-aliasing outward from the curve at least a portion of the spread zone including the additional pixels. After the anti-aliasing, an image display module displays the curve with the anti-aliased pixels.

More specifically, a dynamic spread anti-aliasing module includes multiple modules that each implement at least one stage of the anti-aliasing pipeline. The first three stages of the anti-aliasing pipeline are performed by a central processing unit (CPU), and the remaining stages are performed by a graphics processing unit (GPU). In an initial stage, a graphics data preparation module prepares graphics data for an anti-aliasing procedure. To do so, a diversity of graphics data is harmonized to simplify the anti-aliasing pipeline. Graphics data is harmonized to correspond to quadratic filled Bezier paths. Thus, higher order Bezier paths are converted to quadratic Bezier paths, and stroked Bezier paths are converted to filled Bezier paths. However, the harmonizing of graphics data may be omitted.

In a second stage of the anti-aliasing pipeline, a tessellation module tessellates a quadratic filled Bezier path to produce multiple tessellated tiles. The tessellated tiles include interior tessellated tiles and exterior tessellated tiles. The interior tessellated tiles are passed through the pipeline without anti-aliasing using a classification mechanism, which is described below. Each of the exterior tessellated tiles intersects at least one quadratic Bezier curve forming a part of the quadratic Bezier path. The exterior tessellated tiles therefore function as control tiles, such as control triangles, for quadratic Bezier curves.

In a third stage, the tessellation module also analyzes the tessellated tiles to generate control tile descriptors. A control tile descriptor for a corresponding control tile includes multiple vertices of the control tile and a classification. The classification is indicative of a control tile location, such as interior or exterior; a type of a corresponding curve, such as linear or non-linear; and a side of the corresponding curve to anti-alias, such as convex or concave. The control tile descriptors are passed from the CPU to the GPU.

In a fourth stage, an expansion module expands the control tiles based on the control tile descriptors. Interior control tiles are forwarded along the graphics pipeline to bypass the anti-aliasing procedure. Each of the curves corresponding to exterior control tiles are anti-aliased, but individual exterior control tiles are treated differently depending on the type of curve. Triangle-shaped control tiles are used below to describe an example of the fourth stage of the anti-aliasing pipeline. The expansion module includes a transformation module and an enlargement module. The transformation module transforms each exterior control triangle into an expanded control polygon that spreads out the pixel coverage for anti-aliasing. In some embodiments, the expanded control polygon is implemented as a rectangle with 90-degree angles to facilitate computation within the GPU.

If the curve type is non-linear, the transformation module transforms a control triangle into a control rectangle that is the same height and width as the control triangle. The enlargement module then creates an expanded control rectangle having new vertices by extending an edge of the control rectangle outward and away from the non-linear curve on a side of the curve that is to be anti-aliased (e.g., on a side of the curve that is opposite to a fill side). The transformation and enlargement, either individually or jointly, of a control tile for a non-linear curve establishes a spread zone that encompasses additional pixels that are then subject to anti-aliasing.

If the curve type is linear, on the other hand, the control triangle is effectively a flat control triangle with zero area. The transformation module transforms the flat control triangle into a flat control rectangle that still has zero area. The enlargement module then creates an expanded control rectangle having new vertices by extending an edge of the flat control rectangle outward and away from the linear curve on a side of the curve that is to be anti-aliased (e.g., on a side of the curve that is opposite to a fill side). Thus, this transformation and enlargement of a control tile for a linear curve also establishes a spread zone that encompasses additional pixels that are then subject to anti-aliasing. The additional pixels ensure that sufficient anti-aliasing for a curve can be performed without relying on subpixel multisampling.

A vertex updating module implements fifth and sixth stages of the anti-aliasing pipeline to accommodate the new vertices of the expanded control tiles. Based on these new vertices, the vertex updating module extrapolates graphical attributes, such as color and gradient positioning, for the fifth stage. Barycentric extrapolation, for example, can be used for the fifth stage updating. For the sixth stage, the vertex updating module maps texture coordinates based on the new vertices. A transformation matrix can be applied to remap the texture coordinates in user space for the new vertices of the expanded control tiles. In a seventh stage of the anti-aliasing pipeline, an expansion curtailment module controls an impact of the expanded control tiles, which are derived from the exterior control tiles, on the interior control tiles. During fragment shading, a fill value for an expanded control tile that lies outside the locus of points of the original exterior control tile is discarded to prevent fill values of interior control tiles from being overwritten.

An image tuning module implements eighth and ninth stages of the anti-aliasing pipeline. In the eighth stage, the image tuning module performs alpha modulation on each expanded control tile outward from the curve so as to include the additional pixels of the spread zone. The alpha modulation realizes the anti-aliasing by adapting a transparency value of at least some of the additional pixels based on respective distances between the curve and individual ones of the additional pixels. The ninth stage is used to account for subpixel zoom levels. Neither a separate anti-aliasing technique nor an additional set of graphics data need be implemented. Instead, the image tuning module performs a color adjustment for pixels of a Bezier curve that is displayed at a subpixel zoom level. The color adjustment is based on a current zoom level and a stroke width of the Bezier curve.

In these manners, dynamic spread anti-aliasing achieves single-sampled anti-aliasing. The omission of multi-sampling results in reduced graphics memory requirements and higher processing performance, including when applying complex rendering effects involving gradients and blends. Further, dynamic spread anti-aliasing as described herein can be implemented as a single technique from standard zoom levels through subpixel zoom levels. Utilizing one anti-aliasing technique for both standard and subpixel zoom levels further alleviates demands on device resources and also presents a more seamless and consistent viewing experience for the end-user.

In the following discussion, after some example terminology is set forth, an example environment is described that may employ the techniques described herein. Example embodiment systems, apparatuses, and techniques are then described, followed by a section explaining example embodiment procedures and processes. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, embodiments presented herein. Some terms are further elucidated using one or more examples.

A "curve" refers to a shape that is displayable on a screen of an electronic device as a one-dimensional or two-dimensional geometric object. Examples of curves include a line segment, an arc, a parabola, a wave, and a squiggle. Curves can be any of multiple possible degrees. A "linear curve" refers to a first degree or "straight" curve, such as a line segment. A "non-linear curve" refers to "rounded" curves having a second or higher order, such as an arc. Examples of non-linear curves include those that are quadratic, cubic, quartic, and so forth. A quadratic curve, for instance, includes a convex side and a concave side. If a curve forms an edge of an overall object, like a circle or hillside, that is presented as having a fill color, a fill pattern, etc., the curve has a "fill side" and a "non-fill side." The "fill side" of the curve is generally toward the inside of a closed object. The "non-fill side" of the curve is generally toward the outside of a closed object.

A "Bezier curve" is an example of a smooth curve. Mathematically, a Bezier curve can be based on the Bernstein polynomial. A Bezier curve can be of any degree, including linear, quadratic, or cubic. Bezier curves can be scaled at effectively an infinite range of zoom levels while remaining mathematically smooth. A "Bezier path" refers to a group of linked, adjoining, or connected Bezier curves. A Bezier path can serve as a border or edge around an overall object, such as a displayed car.

"Anti-alias" refers to a process or technique that smoothes the appearance of a curve that would otherwise have an appearance that is rough, blocky, stair-stepped, or zig-zagged due to the rectangular shape of pixels that are used to build or display the curve. The "fill side" of a curve comprises a "non-anti-alias side" of the curve if the curve matches the color or pattern of the fill that is internal to an overall object. The "non-fill side" of a curve comprises an "anti-alias side" of the curve because the pixels of the curve are adjacent to a color or pattern that is external to an overall object and thus differ from that of the curve.

A "control tile" refers to a geometric object, such as a polygon, that defines a position or a shape of a corresponding curve. Additionally or alternatively, a "control tile" refers to a geometric object, such as a polygon, that forms a piece of an overall object that has been segmented into many tiles via tessellation, which is described below. A "control triangle" refers to a triangular control tile that can correspond at least to quadratic non-linear curves. A "flat control triangle" refers to a control triangle that has zero area and corresponds to linear curves. A control tile, including a control triangle, can define or correspond to, for instance, a Bezier curve. A control tile covers a certain locus of pixels on a display screen.

A "tessellation" refers to a technique for segmenting an overall object, such as a circle or building, into multiple geometric shapes called tiles or control tiles. The control tiles resulting from a single tessellation may have the same geometric shape, such as triangular, or may have a number of different shapes. Example shapes for tessellated control tiles include triangles, hexagons, irregular polygons, and so forth. A control tile may have an interior location or an exterior location. Control tiles that are internal to an overall object have an interior location. Control tiles that intersect or touch an external boundary of an overall object have an exterior location.

A "control tile descriptor" refers to a data entity that provides a description of a control tile that corresponds to a curve. A control tile descriptor for a corresponding control tile includes multiple vertices of the control tile and a classification. A "classification" for a control tile refers to a control tile location, such as interior or exterior; a type of a corresponding curve, such as linear or non-linear; or a side of the corresponding curve to anti-alias, such as convex versus concave or clockwise versus anti-clockwise.

"Expansion" or "expanding" refers to increasing the pixel coverage of a control tile to create an expanded control tile. For example, a control triangle can be transformed into a control rectangle having the same width and height. Additionally or alternatively, an edge of a control tile can be extended outward away from a curve to enlarge the control tile. Expansion of a control rectangle or a flat control rectangle can produce an expanded control rectangle.

A "spread zone" refers to an area of a display, such as a locus of pixels, that is established beyond the original borders of a control tile as a result of an expansion operation that creates an expanded control tile. "Additional pixels" refers to those pixels that are encompassed by the spread zone and that are not included in the control tile prior to expansion. The additional pixels of a spread zone may be contiguous or noncontiguous with respect to other additional pixels of the spread zone. At least some of the additional pixels can be subjected to anti-aliasing to smooth the appearance of a curve corresponding to the expanded control tile.

A "triangle strip" refers to two or more control triangles, each of which is adjacent to at least one other control triangle of the triangle strip. A triangle strip can be rectangular or can share vertices to reduce data consumption or memory usage. A triangle strip can be input to, operated on, or output from at least one stage of an anti-aliasing pipeline or a graphics processing pipeline.

An "alpha modulation" refers to modifying a transparency level of a displayed object or pixel. For example, the relative level of transparency, opaqueness, or pixel coverage of a foreground element versus a background element can be modified as part of a composition to achieve a color for display. In the context of anti-aliasing, alpha modulation can adapt a transparency value of at least some pixels outward from a curve, which may include the actual curve too. The adaptation can be based on a respective distance between the curve and each respective pixel being anti-aliased. With dynamic spread anti-aliasing, alpha modulation is performed on at least some of the additional pixels of a spread zone to produce anti-aliased pixels that are displayed to present an anti-aliased version of a curve.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this written description.

Example Environment

FIG. 1 illustrates an environment 100 for example embodiments that are operable to implement dynamic spread anti-aliasing with a dynamic spread anti-aliasing module 104. As illustrated, the example environment 100 includes at least one computing device 102, at least one user input/output (I/O) device 124, and at least one user 106. FIG. 1 also depicts a user interaction between the user 106 and the user I/O device 124 that produces a user control signal 126. The computing device 102 includes a processing system 116 and a memory 118. The processing system 116 includes an operating system 120. The memory 118 includes an application 122, which includes the dynamic spread anti-aliasing module 104. Example implementations for the computing device 102 are described further below in this section.

As shown on a display screen associated with the computing device 102, the application 122 may be realized as an imaging application, such as a graphic arts design program or vector image manipulation program. The imaging application enables an image 108, including a vector image, to be manipulated or at least displayed at different zoom levels. For example, the user 106 can resize a view of the image 108 by zooming in or out of the displayed image, can change a visual appearance of the image 108 by adjusting colors or brightening the displayed image, or can change aspects—such as size, shape, or position—of vectors or bitmapped data forming the image 108. Additionally, the user 106 can be empowered to further change the content of the image 108 by adding or removing objects to or from the image 108.

To enable the user 106 to modify the image 108, the imaging application provides a number of tools 128. Examples of tools 128 include a selection tool, a brush tool, a paint tool, and an effects tool. To enable the user 106 to easily see a current state of the image 108 or how a tool will affect or has affected the image 108, the imaging application displays a number of settings 130. Examples of settings 130 include a color palette, a selected font, a layer indication, a set of options for a currently-selected tool of the tools 128, and a zoom level setting, such as a slider or an adjustable percentage indication. Although shown in the context of a device that enables touch-screen interaction, the tools 128, the settings 130, etc. of the imaging application can alternatively be utilized via mouse, touchpad, voice interaction, or some combination thereof.

The image 108 includes a picture having one or more curves that are visible to the human eye. As shown in the image 108, an example curve is presented on the display screen of the computing device 102. Curves are presented on the display screen using multiple pixels that are arrayed in a grid of pixels. If the pixels are sufficiently large and the eye is sufficiently close to the display screen, individual pixels are discernable to the human eye. Alternatively, at least the visual effect of constructing curves with individual pixels is discernable to the human eye in the form of zig-zagged or stair-stepped curves. This visible aspect of using discrete pixels to present the curves of an image is called aliasing. Smoothing the look of the jagged appearance is called anti-aliasing.

An example of a simulated visual result of an anti-aliasing operation 114 is shown at the top of the environment 100. On the left, an example curve 110 is shown without anti-aliasing. On the right, an example curve 112 is shown with simulated anti-aliasing. The jagged nature of the curve 110 is readily apparent. The appearance of the curve 112, however, has been smoothed to reduce the visibility of the stair-stepped alias effect. In an example approach to anti-aliasing, the pixels on or around a curve are subtly shaded—such as from black to gray to white—to blur adjacent pixels from the perspective of the human eye. Consequently, the ability to discern individual pixels, as well as the stair-stepped or jagged appearance resulting from adjacent pixels having a starkly contrasting color or shade, is substantially reduced through anti-aliasing. Example embodiments for the anti-aliasing operation 114 that are performed by the dynamic spread anti-aliasing module 104 are described below in the following sections.

The computing device 102 may be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1), a mobile device coupled to a separate screen, an entertainment appliance such as a smart television, a game console, a wearable computing device such as a smart watch or intelligent glasses, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 116, an example of a computer-readable storage medium illustrated as memory 118, and so forth. Other hardware components are also contemplated as described herein with reference to FIG. 15. The processing system 116 is representative of functionality to perform operations through execution of instructions stored in the memory 118. Although illustrated as two separate components, functionality of the processing system 116 and the memory 118 may be combined into one component (e.g., on an application specific integrated circuit (ASIC) or as instructions are loaded from the memory onto a processor) or may be further divided into a greater number of components. Examples of a user I/O device 124 include a keyboard, a mouse, a touchpad, a touch screen, a microphone, a camera, a display device such as a screen or projector, a speaker, or some combination thereof. The user I/O device 124 may be separate from, or integrated with, the computing device 102. The computing device 102 is further illustrated as including an operating system 120. The operating system 120 is configured to abstract underlying hardware functionality of the computing device 102 to the application 122 that is executable on the computing device 102.

In example embodiments, the dynamic spread anti-aliasing module 104 is located at or executing on the computing device 102, such as by being part of the application 122 or the operating system 120. The dynamic spread anti-aliasing module 104 represents functionality to implement schemes and techniques for dynamic spread anti-aliasing as described herein. The dynamic spread anti-aliasing module 104 can be implemented as at least part of a software package that executes on and specially configures one or more processors, which processors may physically realize the processing system 116; as a hardware apparatus, which may be realized as an ASIC or as the computing device 102; or using a combination of software, hardware, firmware, or fixed logic circuitry; with some combination thereof; and so forth. As described herein with reference to FIG. 15, the dynamic spread anti-aliasing module 104 may be fully or partially implemented as a web or cloud-based image manipulation service.

Figure 2:
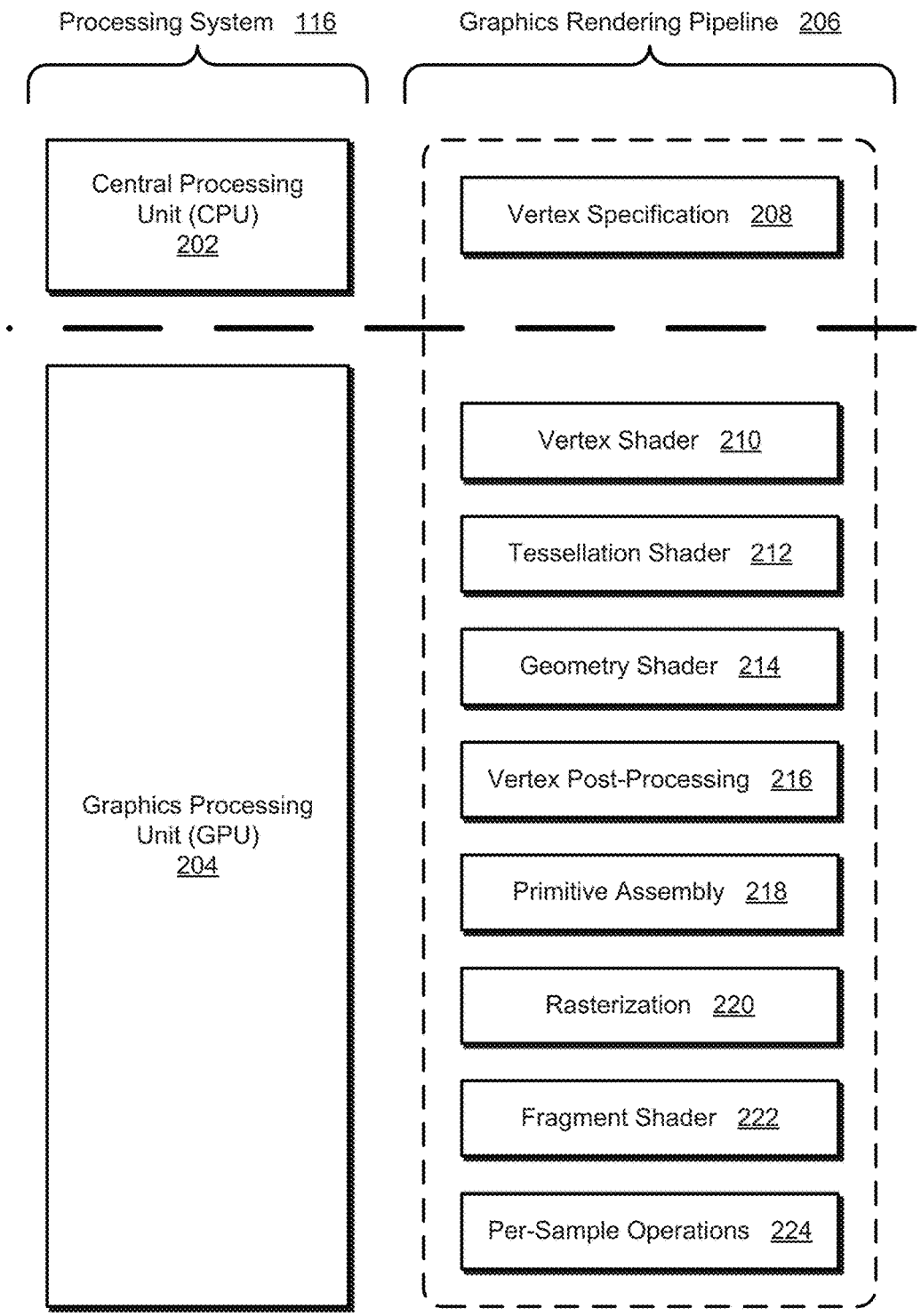
FIG. 2 is a schematic diagram illustrating an example correspondence between different processing units and different stages of a graphics rendering pipeline.

FIG. 2 is a schematic diagram 200 illustrating an example correspondence between different processing units of a processing system 116 and different stages of a graphics rendering pipeline 206. The example processing system 116 includes two processing units: a central processing unit (CPU) 202 and a graphics processing unit (GPU) 204. As illustrated, the graphics rendering pipeline 206 comports with the OpenGL graphics pipeline; however, graphics rendering pipelines may be implemented in alternative manners. The graphics rendering pipeline 206 includes an example nine stages. Some stages may be omitted or performed in an order that differs from that illustrated in FIG. 2 or described below. The first of these nine stages is a vertex specification stage 208. The last eight of these nine stages include: a vertex shader 210, a tessellation shader 212, a geometry shader 214, a vertex post-processing stage 216, a primitive assembly stage 218, a rasterization stage 220, a fragment shader 222, and a per-sample operations stage 224.

In some embodiments, graphics processing is shared between the CPU 202 and the GPU 204. A thick dashed line separates CPU operations from GPU operations in accordance with an example approach to the sharing of processing operations. The CPU 202 performs those operations that correspond to the first of the nine illustrated stages. The CPU 202 then passes the graphics data that is being processed to the GPU 204. The GPU 204 performs those operations that correspond to the last eight of the nine illustrated stages. In the following sections, example stages of the graphics rendering pipeline 206 are referenced to provide context of how dynamic spread anti-aliasing can be integrated with a conventional graphics pipeline. Nevertheless, dynamic spread anti-aliasing may be implemented in conjunction with one or more alternative stages of a graphics rendering pipeline.

Systems and Techniques

Figure 3:
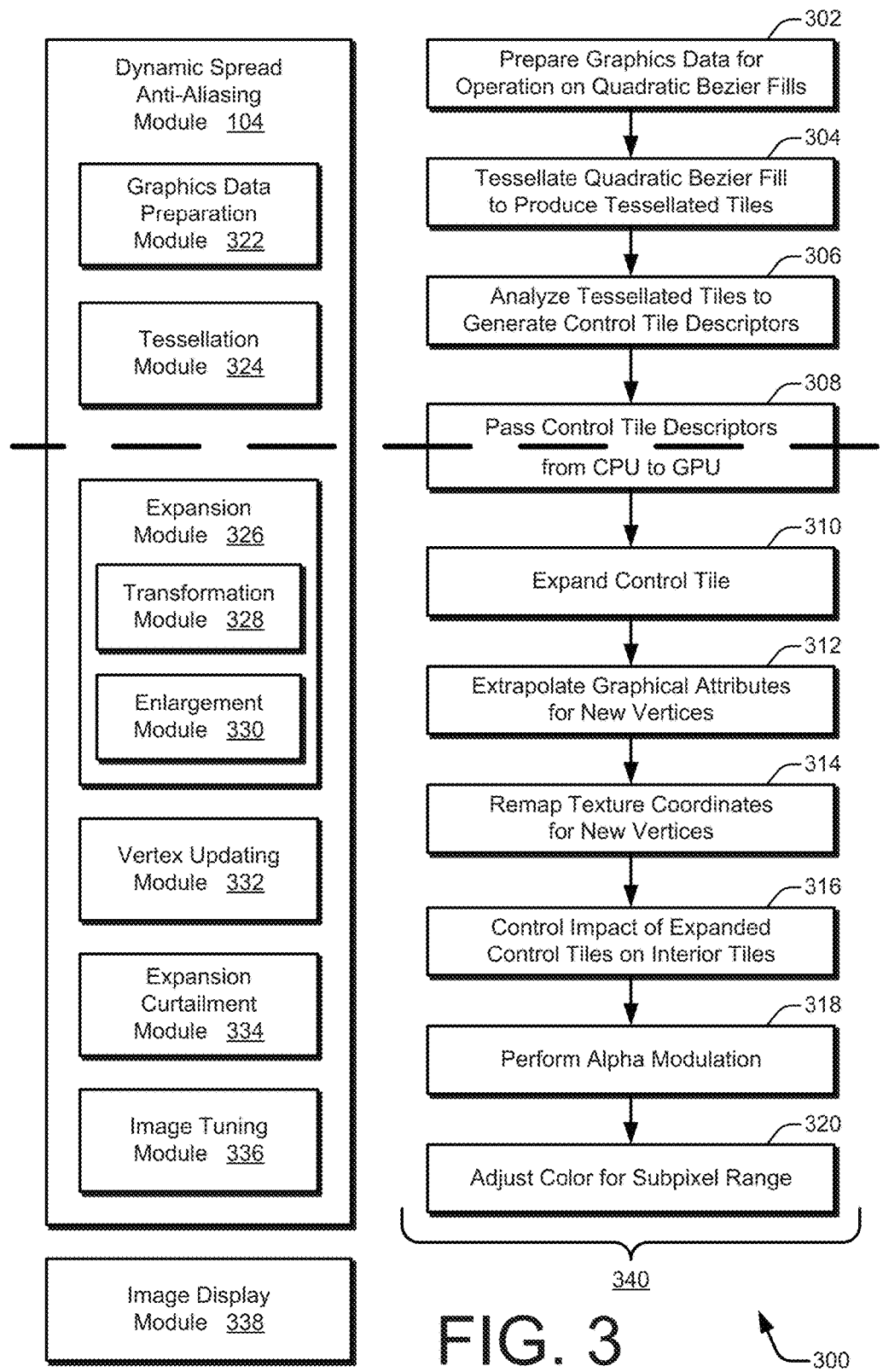
FIG. 3 is a schematic diagram illustrating an example correspondence between different modules of a dynamic spread anti-aliasing module and different stages of an anti-aliasing pipeline.

FIG. 3 is a schematic diagram 300 illustrating an example correspondence between different modules of a dynamic spread anti-aliasing module 104 and different stages of an anti-aliasing pipeline 340. As illustrated, the anti-aliasing pipeline 340 includes nine stages 302-306 and 310-320, and the dynamic spread anti-aliasing module 104 includes six modules 322-326 and 332-336. However, different orders, combinations and numbers of stages or modules may alternatively be implemented to realize embodiments of dynamic spread anti-aliasing. The schematic diagram also includes an image display module 338. The nine stages of the anti-aliasing pipeline 340 may be overlaid on one or more stages of the graphics rendering pipeline 206 (of FIG. 2).

In example embodiments, the first three stages 302-306 of the anti-aliasing pipeline 340 are performed by the CPU 202, and last six stages 310-320 are performed by the GPU 204. A thick dashed line separates CPU operations from GPU operations. In the first stage 302, a graphics data preparation module 322 prepares graphics data for an anti-aliasing procedure that is to be performed on quadratic filled Bezier paths. Thus, to simplify the anti-aliasing pipeline 340, a diversity of graphics data is harmonized by converting different curves into quadratic filled Bezier paths. To do so, higher order Bezier paths (e.g., cubic Bezier paths) are converted to quadratic Bezier paths using, for instance, a curve-by-curve conversion mechanism. Also, stroked Bezier paths are converted to filled Bezier paths. Using both types of conversions, the graphics data preparation module 322 outputs quadratic filled Bezier paths for the second stage of the anti-aliasing pipeline 340.

In the second stage 304, a tessellation module 324 tessellates a quadratic filled Bezier path to produce multiple tessellated tiles, such as tessellated triangles or another polygon. The tessellated tiles can be classified by location as being interior tessellated tiles or exterior tessellated tiles. The interior tessellated tiles may be omitted from the remainder of the anti-aliasing pipeline 340 because each is completely filled and adjacent to a filled portion of another tessellated tile. On the other hand, each of the exterior tessellated tiles intersects at least one quadratic Bezier curve forming a part of the quadratic Bezier path. The exterior tessellated tiles function as control tiles, such as control triangles for respective corresponding quadratic Bezier curves. In the third stage 306, the tessellation module 324 analyzes the tessellated tiles to generate control tile descriptors. A control tile descriptor for a corresponding control tile includes a classification and multiple vertices of the control tile. The classification is indicative of a control tile location—interior or exterior, a type of a corresponding curve—linear or non-linear, and a side of the corresponding curve to anti-alias—convex or concave. As indicated by a block 308, the control tile descriptors are passed from the CPU 202 to the GPU 204.

Within the GPU 204, the interior control tiles are forwarded along the graphics rendering pipeline 206 to bypass the anti-aliasing procedure (e.g., interior control tiles can be passed through the geometry shader 214 unchanged). In the fourth stage 310, an expansion module 326 expands the exterior control tiles based on the control tile descriptors. The fourth stage 310 can be implemented in conjunction with (e.g., along with or as part of) the tessellation shader 212 or the geometry shader 214 of the graphics rendering pipeline 206. A triangular control tile is used herein as an example shape for the control tiles to describe operation of the expansion module 326; however, control tiles with other shapes may alternatively be implemented. A triangle-shaped control tile, or control triangle, has three vertices. The expansion module 326 includes a transformation module 328 and an enlargement module 330. The exterior control triangles are treated differently by the transformation and enlargement modules depending on the type of corresponding curve—linear or non-linear. A linear curve type corresponds to a line, and a non-linear curve type corresponds to quadratic, cubic, or higher-ordered curves.

For a non-linear curve type, the transformation module 328 transforms a control triangle into a control rectangle that is the same height and width as the control triangle. The enlargement module 330 then extends an edge of the control rectangle outward away from the non-linear curve based on a curve side to be anti-aliased. Specifically, the edge is extended on a side of the curve that is to be anti-aliased (e.g., on a side of the curve that is opposite to a fill side) to produce an expanded control rectangle with new vertices. The expanded control rectangle includes four new vertices—some of which may be co-positioned with those of the control triangle. This transformation and enlargement of the control triangle for a non-linear curve dynamically creates a spread zone that encompasses additional pixels around the control triangle and the corresponding linear curve. The additional pixels are subject to anti-aliasing. The spread zone thus represents an increase to the set of pixels considered for anti-aliasing any given Bezier curve.

For a linear curve type, on the other hand, the control tile is effectively a flat control triangle having a zero area. The transformation module 328 transforms the flat control triangle into a flat control rectangle that still has zero area. The enlargement module 330 then extends an edge of the flat control rectangle outward away from the linear curve on a side of the curve that is to be anti-aliased (e.g., on a side of the curve that is opposite to a fill side) to produce an expanded control rectangle with new vertices. The expanded control rectangle includes four new vertices—two of which are co-positioned with those of the flat control triangle. Thus, this transformation and enlargement of the control triangle for a linear curve also dynamically creates a spread zone that encompasses additional pixels around the control triangle and the corresponding linear curve, with the additional pixels being subject to anti-aliasing. The additional pixels ensure that sufficient anti-aliasing for a curve can be performed without relying on pixel multisampling.

A vertex updating module 332 implements the fifth stage 312 and the sixth stage 314 of the anti-aliasing pipeline 340. Based on the new vertices of the expanded control rectangles, the vertex updating module 332 extrapolates graphical attributes, such as color and gradient positioning, for the fifth stage 312. The graphical attributes can be extrapolated for the new vertices using a Barycentric extrapolation. For the sixth stage 314, the vertex updating module 332 maps texture coordinates based on the new vertices. A transformation matrix can be applied to remap the texture coordinates in user space. In the seventh stage 316, an expansion curtailment module 334 controls an impact that the expanded control rectangles might have on the interior control triangles. During fragment shading, for example, a fill value for an expanded control rectangle that lies outside the area occupied by the corresponding original exterior control triangle is discarded to prevent the fill values of interior control triangles from being overwritten.

An image tuning module 336 implements the eighth stage 318 and the ninth stage 320 of the anti-aliasing pipeline 340. In the eighth stage 318, the image tuning module 336 performs an alpha modulation on at least some of the pixels of the expanded control rectangle, including the additional pixels of the spread zone. The alpha modulation realizes the anti-aliasing by adapting a transparency value of at least some of the additional pixels outward from the curve based on a respective distance between the curve and each respective pixel of the additional pixels. The eighth stage 318 can be implemented in conjunction with (e.g., along with or as part of) the fragment shader 222 of the graphics rendering pipeline 206. The ninth stage 320 is used to accommodate image displays in the subpixel realm. The image tuning module 336 performs a color adjustment for pixels corresponding to curves that are currently displayed at a subpixel zoom level. The color adjustment is based on a current zoom level and a stroke width of the curve. Responsive to the operations of the anti-aliasing pipeline 340, the image display module 338 can display the image 108 (of FIG. 1) with curves 112 having an anti-aliased appearance without multisampling and without using a different anti-aliasing technique for subpixel zoom levels.

Figure 4:
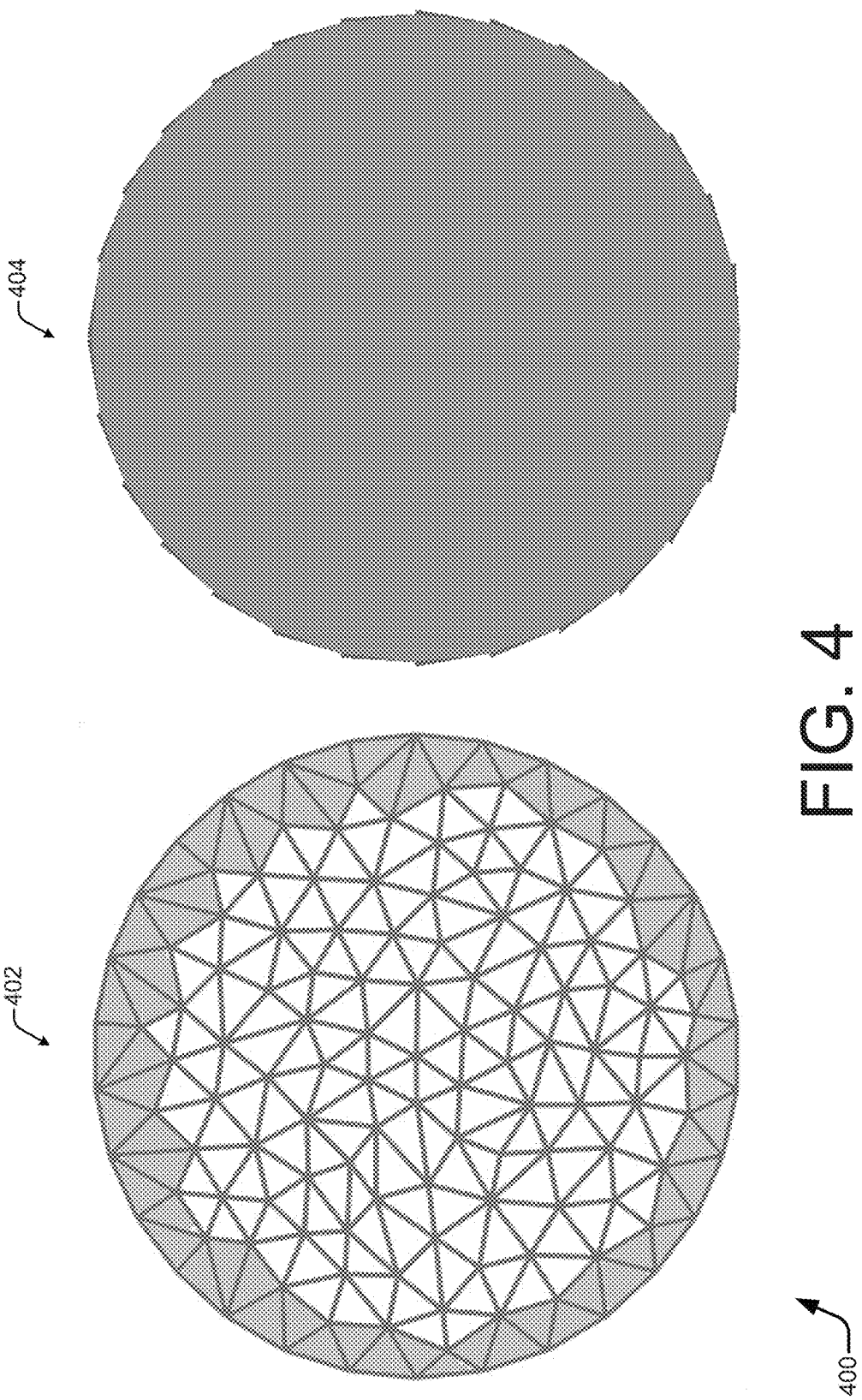
FIG. 4 illustrates example aspects of a tessellation of a filled Bezier path.

FIG. 4 illustrates generally at 400 example aspects of a tessellation of a filled Bezier path. The example filled Bezier path is substantially a circle. With the circle 402 on the left, the fill has been omitted to reveal an example tessellation of the circle into numerous control triangles. Any of many known tessellation algorithms may be employed to tessellate a filled Bezier path. For example, Vatti's algorithm may be used to realize a tessellation engine that produces two kinds of triangles—those that are located in the interior of the Bezier path and those that are located along the exterior. As shown, the interior control triangles are white, and the exterior control triangles are shaded light grey. In the illustrated example, the tessellation is air-tight such that no gaps between triangles are present. The example tessellation of the circle 402 is produced after the cubic Bezier path is flattened into multiple connected line segments to demonstrate a complete and exact air-tight tessellation.

However, example embodiments described herein are capable of performing anti-aliasing on filled quadratic Bezier paths that are not flattened into line segments. With a filled quadratic Bezier path that is formed from quadratic Bezier curves instead of line segments, exterior control triangles overlap the quadratic Bezier curves. The circle 404 on the right illustrates this situation. The edges of the exterior control triangles are visible along the border of, and external to, the filled quadratic Bezier path of the circle 404. The interior control triangles are completely inside the Bezier path's filled region and are therefore fully painted. Hence, anti-aliasing is not applied to the interior control triangles. The exterior control triangles, on the other hand, do no lie completely within the filled region of the Bezier path. The exterior control triangles are therefore partially painted and are marked for anti-aliasing along the border of the filled Bezier path.

Figure 5:
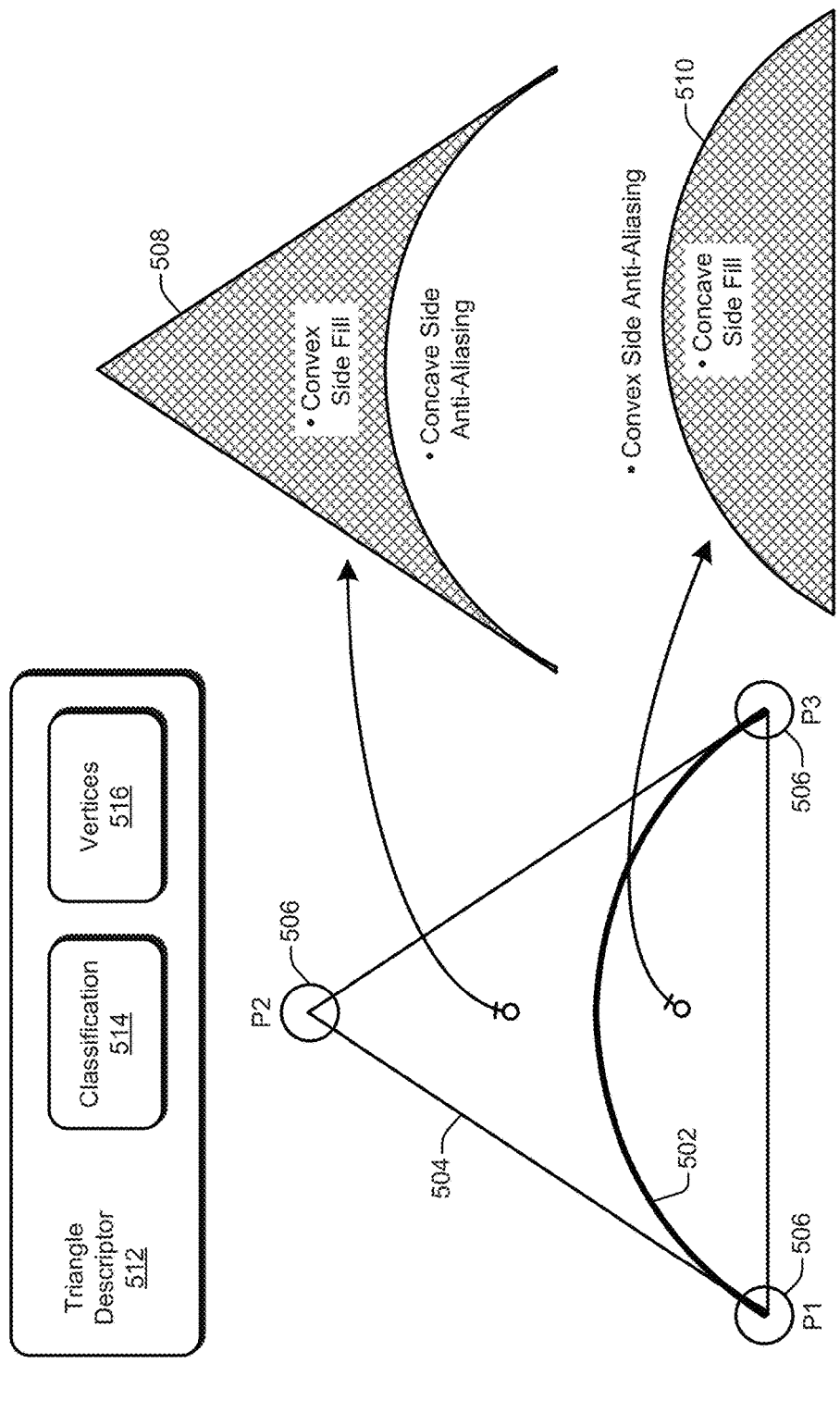
FIG. 5 illustrates an example control triangle implementation of a control tile with different fill and anti-aliasing side characteristics for a corresponding Bezier curve.

FIG. 5 illustrates an example implementation 500 of a control triangle 504 with different potential fill and anti-aliasing side characteristics for a corresponding Bezier curve 502. The control triangle 504 defines the Bezier curve 502 via three control points P1, P2, and P3, which correspond to three vertices 506 of the control triangle 504. An exterior control triangle 504 has two sides split by a quadratic Bezier curve 502. One side is filled, and the other side is anti-aliased. Thus, there are two potential situations for each control triangle 504. These two potential situations are illustrated in the example implementation 500 using a non-linear, quadratic curve having a convex side and a concave side.

In one potential situation as represented by a filled shape 508, the convex side of the curve is filled, and the concave side of the curve is anti-aliased. In another potential situation as represented by a filled shape 510, the concave side of the curve is filled, and the convex side of the curve is anti-aliased. An indication of these potential situations is passed from the CPU 202 to the GPU 204 as part of a triangle descriptor 512 for each control triangle 504. In a manner analogous to that for non-linear curves, a control triangle is passed for each linear curve, but the apex of the control triangle is also the midpoint of the linear curve. Thus, the control triangle for a linear curve is a flat control triangle having a zero area. With a linear curve, one side is filled, and the other side is anti-aliased.

The triangle descriptor 512 includes at least one classification 514 and multiple vertices 516. The vertices 516 provide the coordinate positions of the three vertices 506 (P1, P2, and P3) of the corresponding control triangle 504. The classification 514 includes one or more indicators for triangle location, curve type, and curve side to anti-alias. The triangle location can take an interior or an exterior value. The curve type can take a linear or non-linear value. The curve side to anti-alias can be indicated as being a convex side or a concave side. Equivalently, a curve side to fill, which is the opposite of the side to anti-alias, can be indicated as part of the classification 514.

The characteristics of a control triangle 504 may be encoded into a triangle descriptor 512 in any manner based on the nature of the corresponding curve. In an example embodiment, the vertices 506 are passed as vertex coordinates in user space. The classification 514 is distilled into a single variable taking one of five values. A classifier can select one of the five values to indicate triangle location, curve type, and curve side to anti-alias, depending on the relevancy of each characteristic. A first value corresponds to an interior triangle, in which case curve type and alias side are irrelevant. A second value corresponds to an exterior triangle with convex side anti-aliasing for a non-linear curve. A third value corresponds to an exterior triangle with concave side anti-aliasing for a non-linear curve. A fourth value corresponds to a flat triangle for a linear curve with anti-clockwise side anti-aliasing (e.g., with respect to looking from a first endpoint to a second endpoint). A fifth value corresponds to a flat triangle for a linear curve with clockwise side anti-aliasing (e.g., with respect to looking from a first endpoint to a second endpoint). Examples for the clockwise side and the anti-clockwise side anti-aliasing terminology are described below with reference to FIGS. 12A and 12B. However, other terms or approaches may alternatively be implemented for indicating anti-aliasing sides of linear curves.

Figure 6:
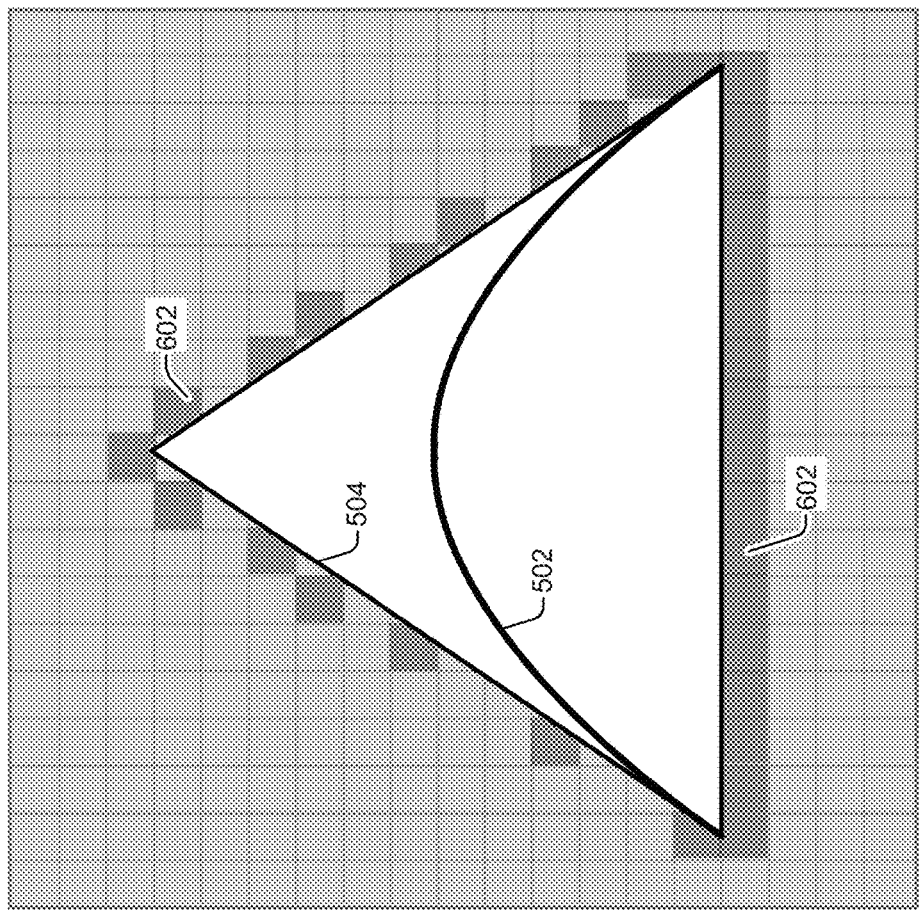
FIG. 6 illustrates an example of a number of pixels that can be omitted from anti-aliasing consideration if a spread zone is not established by expanding a control triangle.

FIG. 6 illustrates generally at 600 an example of a number of pixels 602 that can be omitted from anti-aliasing consideration if a spread zone, which encompasses additional pixels beyond the control triangle 504, is not established. As shown, the control triangle 504 corresponds to the Bezier curve 502. Dark grey pixels 602 are indicated around the border of the control triangle 504. The dark grey pixels 602 illustrate pixels that may be relevant to anti-aliasing as part of the display of the Bezier curve 502 and that can be encompassed by a spread zone so that pixel multisampling can be obviated. Visual examples of a spread zone are shown in FIGS. 9B, 10B, 11B, 12A and 12B.

However, if a spread zone that encompasses additional pixels is not created, a rasterizer of a GPU does not produce sufficient fragments/pixels to color. Absent a spread zone, the rasterizer ignores the dark grey pixels 602 because the control triangle 504 does not cover the centers of the pixels 602. If the rasterizer ignores pixels, such pixels are not passed to a fragment shader. The fragment shader therefore cannot assign any color to the pixels. Consequently, displayed Bezier curves can have a pixelated or broken appearance.

In contrast, by establishing a spread zone by expanding the control triangle 504, pixels such as the dark grey pixels can be covered so that the rasterizer passes them to the fragment shader for alpha modulation. Furthermore, a spread zone can positively impact the subpixel-rendering of Bezier curves. In the subpixel realm, an entire control triangle may occupy an area that fits within a single pixel. Thus, without expanding the control triangle to establish a spread zone, the rasterizer does not produce a pixel for the control triangle and the corresponding Bezier curve is ignored for display purposes. Expansion of a control tile, such as a control triangle, is performed by the expansion module 326 (of FIG. 3). The fourth stage 310 for expanding a control tile is described below with particular reference to FIGS. 7-13.

Figure 7:
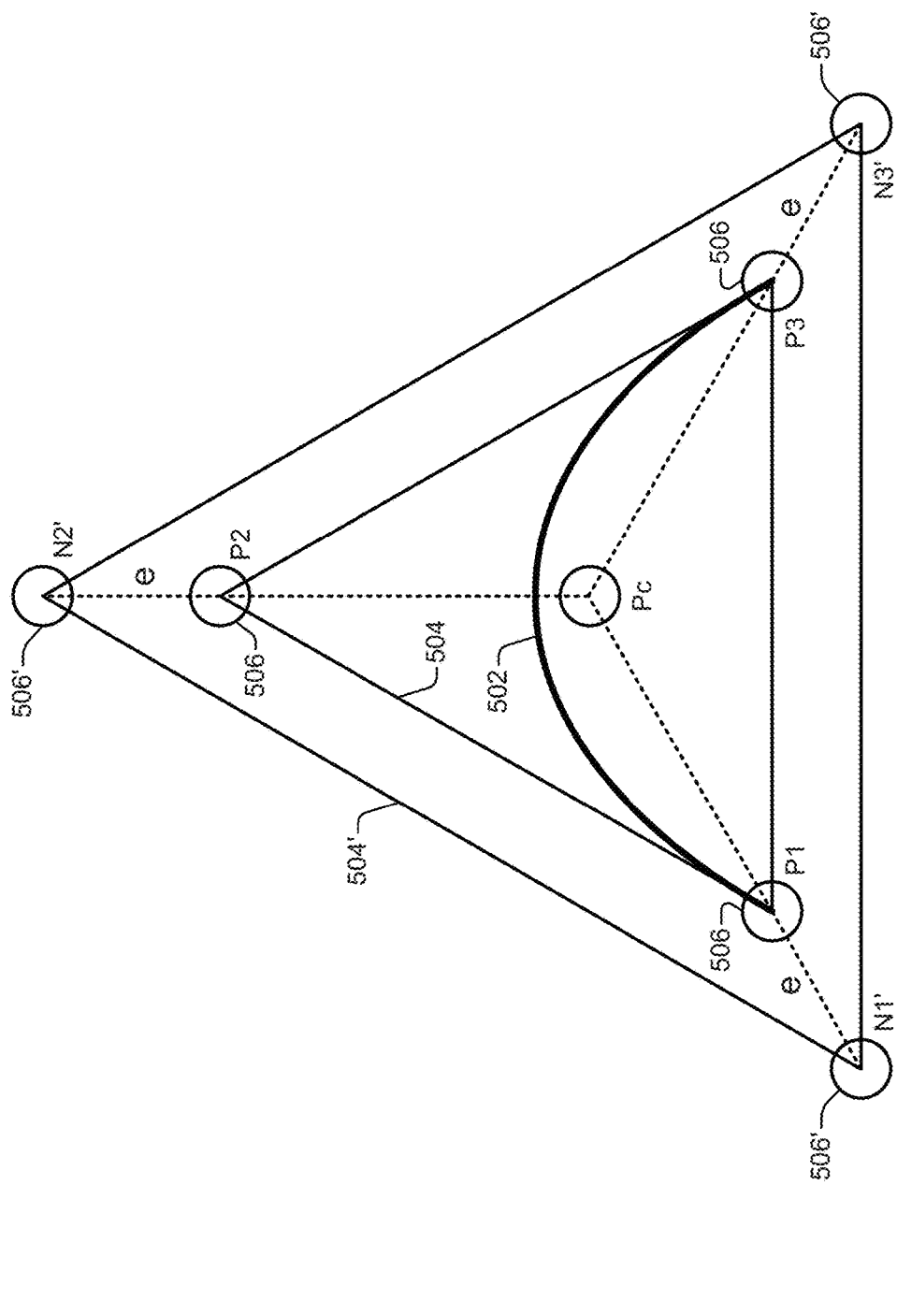
FIG. 7 illustrates an example approach to expanding a control triangle.

FIG. 7 illustrates an example approach 700 to expanding a control triangle 504. Generally, a control triangle 504 can be expanded to increase a coverage of pixels and thereby establish a spread zone that includes additional pixels. The additional pixels encompass those pixels that may be adjusted to provide an anti-aliased display of the Bezier curve 502 corresponding to the control triangle 504. In the example control triangle expansion illustrated in FIG. 7, the control triangle 504 is expanded equally in multiple directions by an amount "e" from the centroid (Pc), or center of gravity, of the triangle. Each of the vertices 506 (P1, P2, and P3) of the control triangle 504 is extended outward by a distance "e" to a respective new position corresponding to new vertices 506' (N1', N2', and N3') to create an expanded control triangle 504'. The spread zone (not explicitly indicated in FIG. 7) for this example expansion is therefore the area of the expanded control triangle 504' that is not coextensive with the original control triangle 504. However, one drawback to implementing this expansion approach is that extending each of the three edges enlarges pixel coverage on both the fill side and the anti-alias side of the curve. Unchecked expansion on the fill side can be harmful because the enlarged portion starts to overlap with interior triangles and therefore produce unwanted artifacts.

Figure 8:
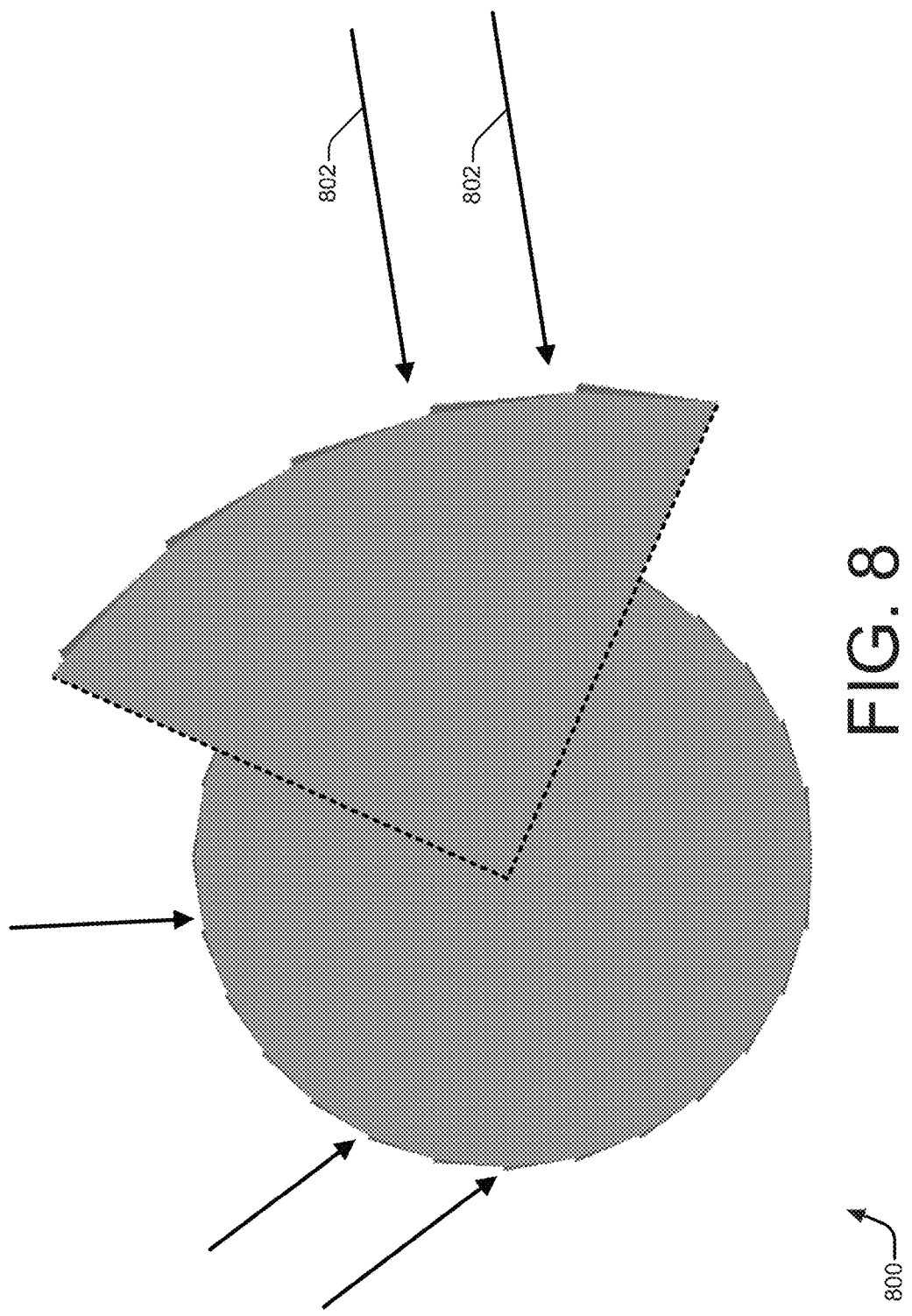
FIG. 8 illustrates an example of pixel locations around a filled Bezier path for which anti-aliasing can be missed without creating an appropriately-sized spread zone when expanding a control triangle.

In another example approach to control triangle expansion (not shown), the base of the control triangle remains unchanged, but the apex control point is extended outward from the curve. However, a drawback to implementing this apex expansion approach is that unless the control point extension is significant, pixels that are relevant to anti-aliasing the corresponding curve are missed, including those pixels between adjoining or connecting quadratic Bezier curves in a quadratic Bezier path. FIG. 8 illustrates generally at 800 an example of pixel locations around a filled Bezier path for which anti-aliasing can be missed. Arrows 802 indicate locations of pixels that are missed if an appropriately-sized spread zone is not established when expanding a control triangle. These particular locations are problematic because the interior angle of the expanded control triangle at the two end points of the corresponding curve may not be sufficiently large so as to contain the centers of the pixels at the indicated locations.

Figure 9B:
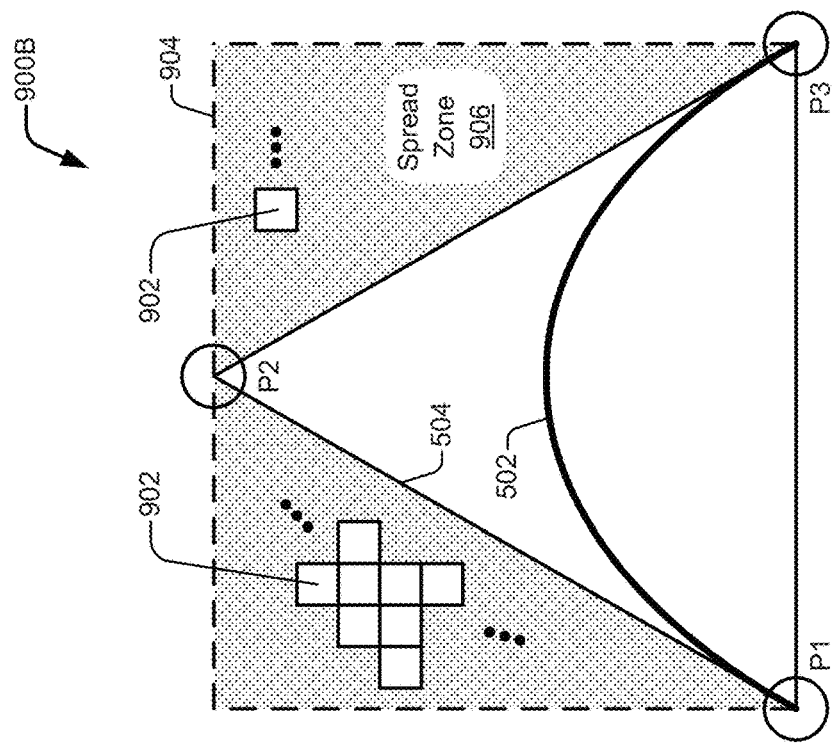
FIGS. 9A and 9B illustrate an example transformation of a control triangle to produce a control rectangle, including an example of a spread zone that results from the transformation.
Figure 9A:
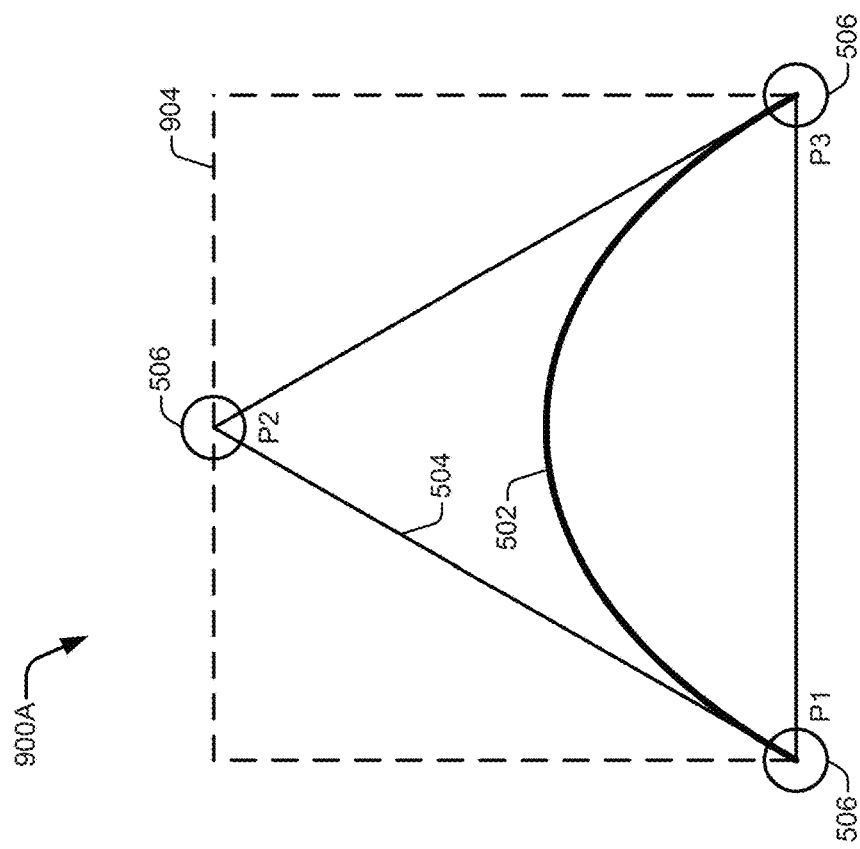

FIGS. 9A and 9B illustrate an example transformation 900A and 900B, respectively, of a control triangle 504 to produce a control rectangle 904. The transformation 900A depicts the expansion of the control triangle 504. The transformation module 328 (of FIG. 3) opens up the control triangle 504 at the apex of the triangle at the vertex 506 that is opposite the Bezier curve 502 and the base of the triangle. The resulting control rectangle 904 has the same height and width as the control triangle 504 and establishes a spread zone. The transformation 900B explicitly indicates an example of a spread zone 906 that is established as a result of the transformation. The spread zone 906 is depicted with a dotted fill pattern. The spread zone 906 includes additional pixels 902 that are not encompassed by the control triangle 504. At least some of these additional pixels 902 are subjected to an anti-aliasing operation for the Bezier curve 502 as described herein.

Thus, each exterior control triangle is transformed into a control rectangle. By opening up the control triangle from its apex, the angle between the original triangle base and the two new sides becomes 90 degrees. However, with the exception of a few corner cases, essentially any angle greater than 45 degrees can establish a spread zone that effectively encompasses sufficient additional pixels for dynamic spread anti-aliasing. Using a 90-degree expansion facilitates computation in the e.g. geometry shader because a relatively straightforward two-dimensional cross product may be employed. Thus, floating point arithmetic and the number of GPU instructions are both simplified. If an angle between the base of the control triangle and the apex is already 90 degrees or more prior to transformation, expansion on that side may be omitted. The other side is nevertheless still expanded beyond 45 degrees, such as to 90 degrees. In such a situation, the resulting control shape, an expanded control polygon, is neither a triangle nor a rectangle. This general expanded control polygon may be utilized with dynamic spread anti-aliasing if the original control polygon is spread so as to obtain sufficient pixel coverage with the resulting spread zone.

Figure 10A:
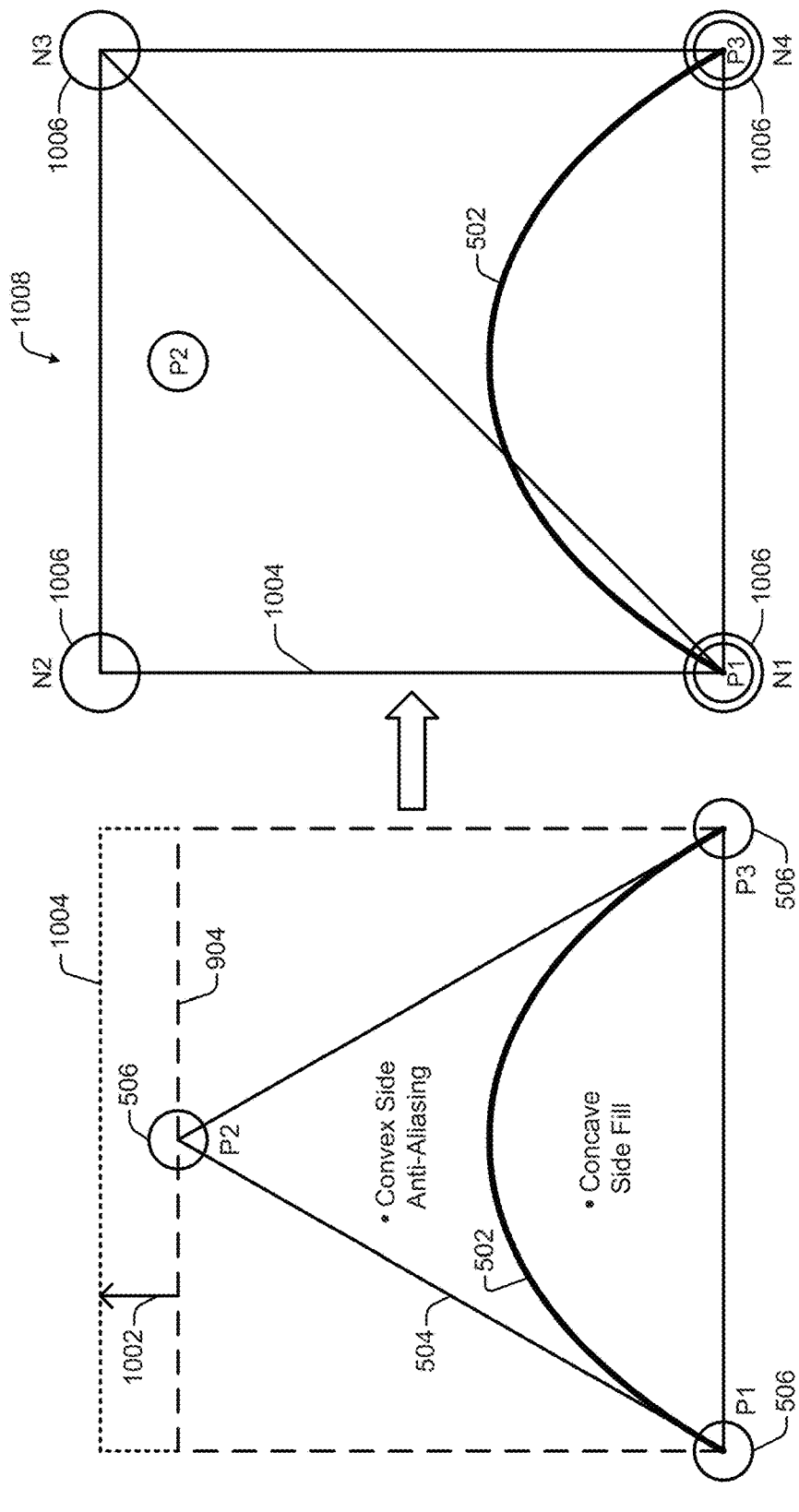
FIG. 10A illustrates an example enlargement of a control rectangle to produce an expanded control rectangle for a non-linear curve with convex side anti-aliasing.

FIG. 10A illustrates an example enlargement 1000A of a control rectangle 904 to produce an expanded control rectangle 1004 for a non-linear curve with convex side anti-aliasing. For the enlargement 1000A, the Bezier curve 502 has a non-linear type and a concave side fill. Thus, the convex side of the Bezier curve 502 is subject to anti-aliasing. Consequently, the enlargement module 330 (of FIG. 3) enlarges the control rectangle 904 on the convex side of the Bezier curve 502 that is to be anti-aliased. To do so, the enlargement module 330 extends an edge of the control rectangle 904 outward and away from the Bezier curve 502 as indicated by an arrow 1002 to create the expanded control rectangle 1004. (As shown, the expanded control rectangle 1004 is bounded by both the dotted lines and the dashed lines.) This extension of the edge of the control rectangle 904 produces sufficient pixel coverage on the anti-aliasing side of the Bezier curve 502. The extension distance along the arrow 1002 can be for any number of pixels. However, a few pixels is typically sufficient to spread the anti-aliasing pixel coverage so as to achieve a visually-satisfactory result. For instance, an extension distance of one to five pixels (e.g., a two pixel extension) can be sufficient.

As shown on the right, the expanded control rectangle 1004 has new vertices 1006 (N1, N2, N3, and N4). The new vertices N1 and N4 are co-located with vertices P1 and P3. The new vertices N2 and N3 are positioned at the corners created by extending the edge of the control rectangle 904 to produce the expanded control rectangle 1004. The expanded control rectangle 1004 is divided into two new triangles. If these two new triangles were output separately, the number of vertices output from e.g. the geometry shader would be doubled from three to six. However, the two new triangles are instead output as a triangle strip 1008, which results in just one additional vertex to implement dynamic spread anti-aliasing (e.g., an increase from three to four vertices).

Figure 10B:
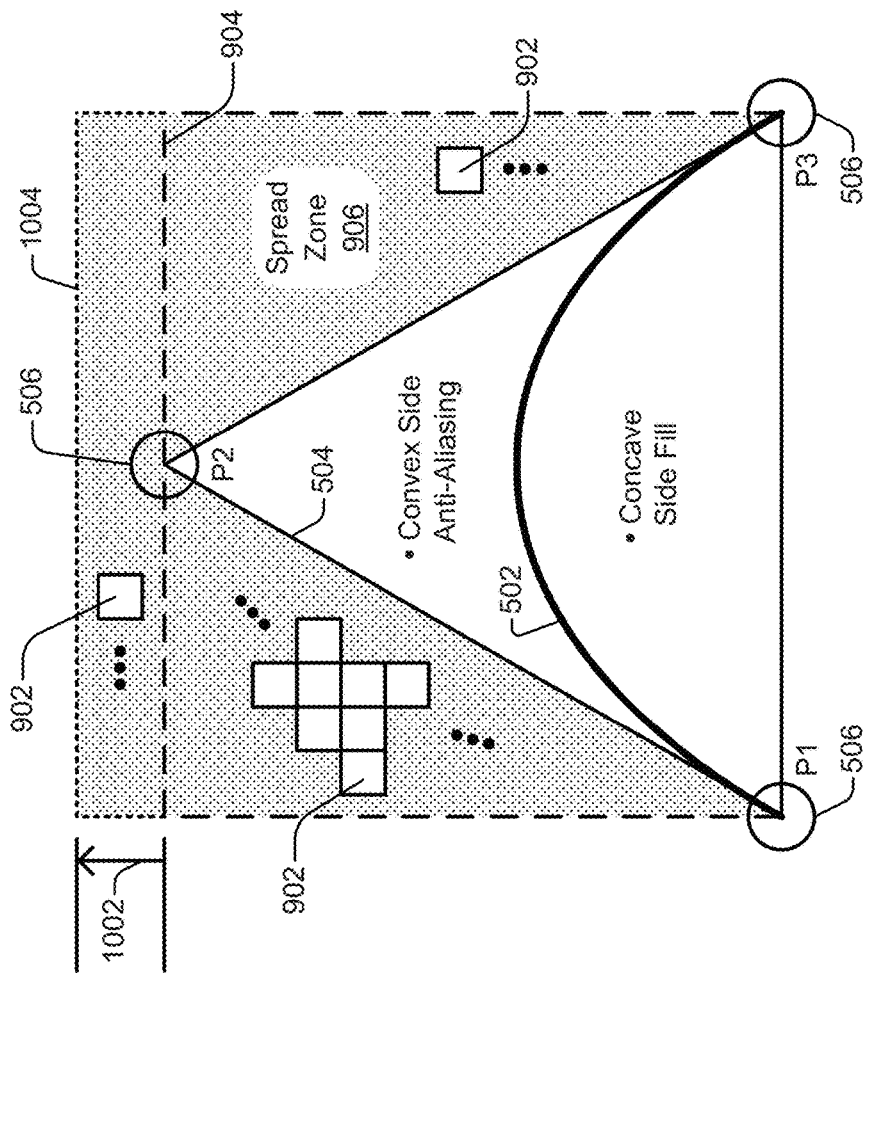
FIG. 10B illustrates an example spread zone included in the expanded control rectangle for a non-linear curve with convex side anti-aliasing.

FIG. 10B illustrates an example spread zone 906 included in the expanded control rectangle 1004 for an instance in which the Bezier curve 502 comprises a non-linear curve with convex side anti-aliasing. The spread zone 906 includes additional pixels 902 that are disposed on the sides of the control triangle 504 and on top of the control triangle 504 above the apex vertex P2. At least some of these additional pixels 902 are subjected to an anti-aliasing operation for the Bezier curve 502 as described below.

Figure 11A:
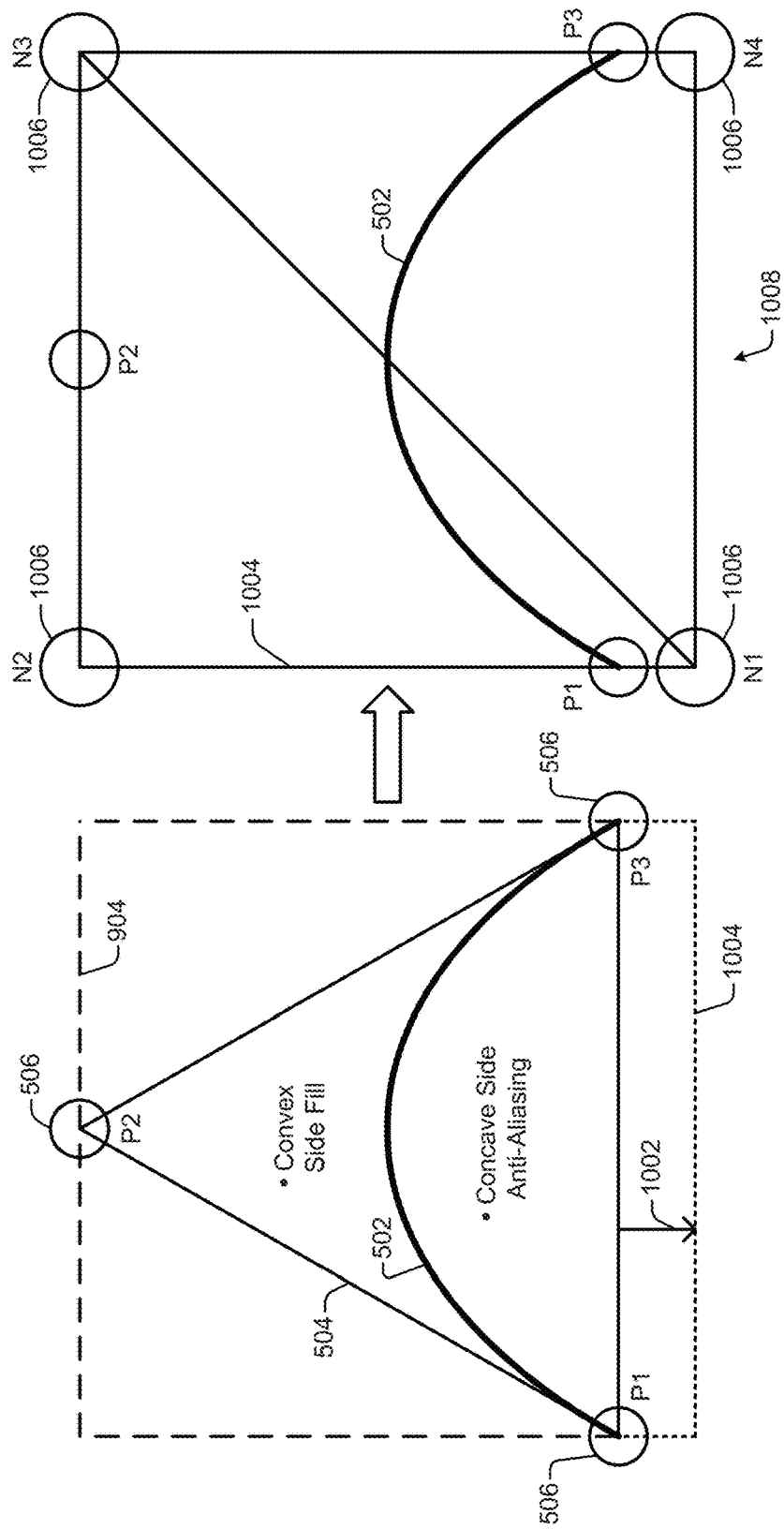
FIG. 11A illustrates an example enlargement of a control rectangle to produce an expanded control rectangle for a non-linear curve with concave side anti-aliasing.

FIG. 11A illustrates an example enlargement 1100A of a control rectangle 904 to produce an expanded control rectangle 1004 for a non-linear curve with concave side anti-aliasing. For the enlargement 1100A, the Bezier curve 502 has a non-linear type and a convex side fill. Thus, the concave side of the Bezier curve 502 is subject to anti-aliasing. Consequently, the enlargement module 330 enlarges the control rectangle 904 on the concave side of the Bezier curve 502 that is to be anti-aliased. To do so, the enlargement module 330 extends an edge of the control rectangle 904 outward and away from the Bezier curve 502 as indicated by an arrow 1002 to create the expanded control rectangle 1004. (As shown, the expanded control rectangle 1004 is bounded by both the dotted lines and the dashed lines.) This extension of the edge of the control rectangle 904 produces sufficient pixel coverage on the anti-aliasing side of the Bezier curve 502. The extension distance along the arrow 1002 can be for any number of pixels. However, a few pixels is typically sufficient to spread the anti-aliasing pixel coverage so as to achieve a visually-satisfactory result. For instance, an extension distance of one to five pixels (e.g., a two pixel extension) can be sufficient.

As shown on the right, the expanded control rectangle 1004 has new vertices 1006 (N1, N2, N3, and N4). None of the new vertices 1006 are co-located with the vertices P1, P2, or P3. The new vertices N2 and N3 are positioned at the corners created by transforming the control triangle 504 into the control rectangle 904, and the new vertices N1 and N4 are positioned at the corners created by extending the edge of the control rectangle 904 to produce the expanded control rectangle 1004. The expanded control rectangle 1004 is divided into two new triangles. If these two new triangles were output separately, the number of vertices would be doubled from three to six. However, the two new triangles are instead output as a triangle strip 1008, which results in just one additional vertex to implement dynamic spread anti-aliasing.

Figure 11B:
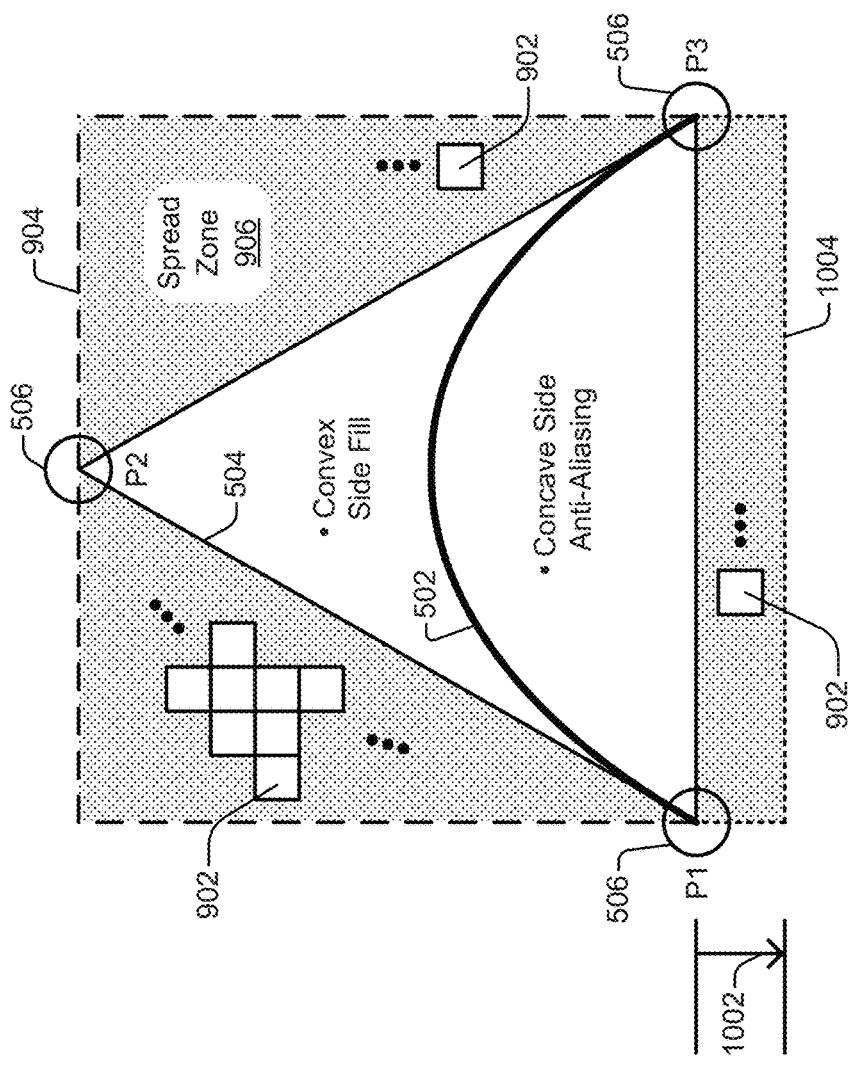
FIG. 11B illustrates an example spread zone included in the expanded control rectangle for a non-linear curve with concave side anti-aliasing.

FIG. 11B illustrates an example spread zone 906 included in the expanded control rectangle 1004 for an instance in which the Bezier curve 502 comprises a non-linear curve with concave side anti-aliasing. The spread zone 906 includes additional pixels 902 that are disposed on the sides of the control triangle 504 and under the control triangle 504 below the base vertices P1 and P3. At least some of these additional pixels 902 are subjected to an anti-aliasing operation for the Bezier curve 502 as described below.

Figure 12A:
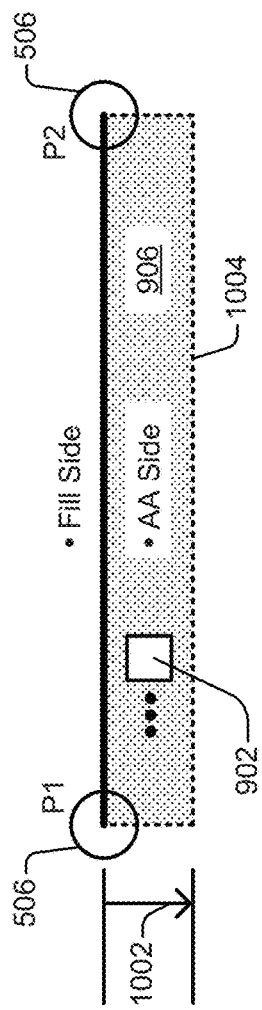
FIG. 12A illustrates an example enlargement of a flat control rectangle of a linear curve to produce an expanded control rectangle on a clockwise side to be anti-aliased.

FIG. 12A illustrates an example enlargement 1200A of a flat control rectangle (not explicitly shown) of a linear curve to produce an expanded control rectangle 1004 on a clockwise side to be anti-aliased. If a clock hand were extended from vertex P1 to P2, the clockwise side of the linear curve, which is the underside here, is to be anti-aliased, and the topside is to be filled. The enlargement module 330 extends an edge of the flat control rectangle outward and away from the linear curve as indicated by an arrow 1002 to create the expanded control rectangle 1004 in a direction of the anti-aliased side. (As shown, the expanded control rectangle 1004 is bounded by both the dotted lines and the solid line of the straight curve.) An example spread zone 906 is also depicted with a dotted fill pattern. The spread zone 906 encompasses additional pixels 902 that are included in the expanded control rectangle 1004. As described above, an extension distance of the edge of the flat control rectangle along the arrow 1002 can be for any number of pixels. However, a few pixels, such as one to five, is typically sufficient to spread the anti-aliasing pixel coverage so as to achieve a visually-satisfactory result.

Figure 12B:
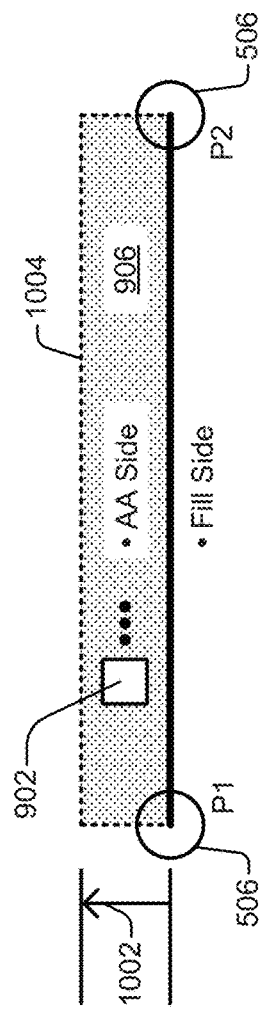
FIG. 12B illustrates an example enlargement of a flat control rectangle of a linear curve to produce an expanded control rectangle on an anti-clockwise side to be anti-aliased.

FIG. 12B illustrates an example enlargement 1200B of a flat control rectangle (not explicitly shown) of a linear curve to produce an expanded control rectangle 1004 on an anti-clockwise side to be anti-aliased. If a clock hand were extended from vertex P1 to P2, the anti-clockwise side of the linear curve, which is the topside here, is to be anti-aliased, and the underside is to be filled. The enlargement module 330 extends an edge of the flat control rectangle outward and away from the linear curve as indicated by an arrow 1002 to create the expanded control rectangle 1004 in a direction of the anti-aliased side. (As shown, the expanded control rectangle 1004 is bounded by both the dotted lines and the solid line of the straight curve.) An example spread zone 906 is also depicted with a dotted fill pattern. The spread zone 906 encompasses additional pixels 902 that are included in the expanded control rectangle 1004. As described above, an extension distance of the edge of the flat control rectangle along the arrow 1002 can be for any number of pixels. However, a few pixels, such as one to five, is typically sufficient to spread the anti-aliasing pixel coverage so as to achieve a visually-satisfactory result.

Figure 13:
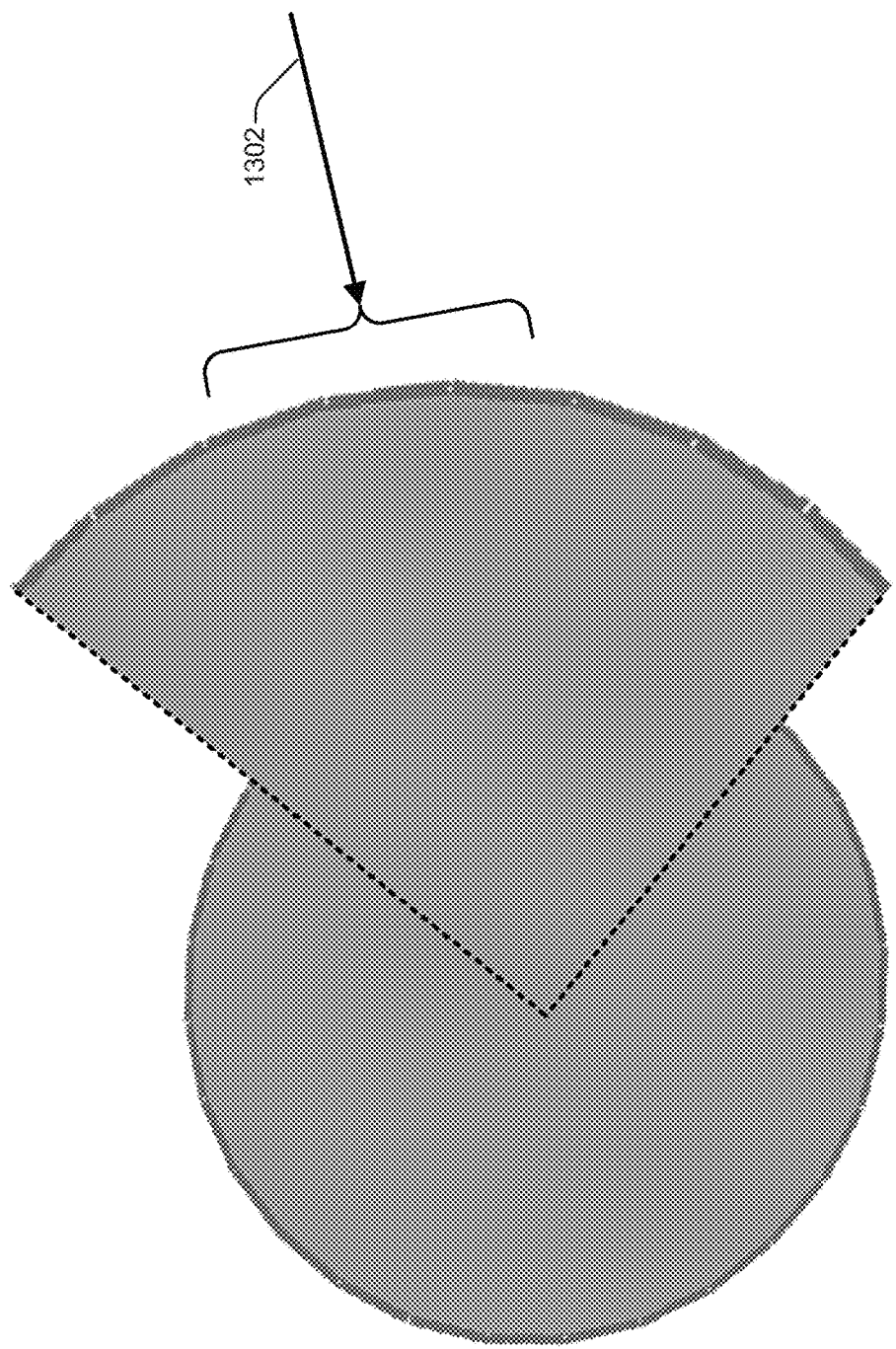
FIG. 13 illustrates an example of anti-aliased pixels along a boundary of a filled Bezier path that has a good appearance after the pixels of an appropriately-sized spread zone are anti-aliased.

FIG. 13 illustrates generally at 1300 an example of anti-aliased pixels along a boundary of a filled Bezier path that has a good appearance after the pixels of multiple appropriately-sized spread zones are anti-aliased. Examples of expanded control rectangles produced for dynamic spread anti-aliasing in e.g. a geometry shader are shown around a sample filled Bezier path that is created from multiple Bezier curves. As is apparent at the magnified region indicated by an arrow 1302, the pixel spread obtained around the path is uniform. Moreover, few pixels, if any, are missed along the border of the filled Bezier path, including at places where adjacent Bezier curves are adjoined.

The vertex updating module 332 (of FIG. 3) updates graphical data based on the new vertices 506' or 1006 resulting from an expanded control tile, such as the expanded control rectangle 1004. The vertex updating module 332 performs the fifth stage 312 for extrapolating graphical attributes based on the new vertices and the sixth stage 314 for remapping texture coordinates for the new vertices.

In the fifth stage 312, graphical attributes are extrapolated based on the new vertices. Control triangle vertices may have associated data, which is uploaded from the CPU to the GPU. Examples of associated vertex data include color, position of a vertex within a gradient, and so forth. Because the new vertices that are output from the e.g. geometry shader for an expanded control rectangle are not the same as those of the original control triangle, the associated vertex data is no longer valid. To compute updated values for the associated vertex data at the new vertices, the vertex updating module 332 performs an extrapolation around the original control triangle. Any graphically-appropriate extrapolation technique, such as Barycentric extrapolation, may be implemented. This approach is analogous to what the GPU would have done for determining data values for the pixels produced by the rasterizer. However, typical post-rasterization processing by the GPU is based on interpolation to obtain data values for pixels that are inside the control triangle. In contrast, the vertex updating module 332 performs Barycentric extrapolation to calculate data values for pixels located outside of the control triangle.

In the sixth stage 314, texture coordinates are remapped based on the new vertices. With some frequency, control triangle vertices have texture coordinates associated with them, such as for texture lookup in the fragment shader. The association between triangle vertices and texture coordinates is created inside the vertex shader using a transformation matrix. In such cases, the vertex updating module 332 remaps these textures coordinates to the new vertices. To do so, the inverse of the model-view matrix is passed to the geometry shader, e.g.—as a uniform variable. Multiplying the new vertices of the expanded control rectangle with this inverted matrix returns the new vertex in the original user space, which is the input coordinate space to the vertex shader. The vertex updating module 332 then uses the same transformation matrix, which would otherwise have been applied in the vertex shader, to obtain remapped texture coordinates.

The expansion curtailment module 334 (of FIG. 3) performs the seventh stage 316 for controlling the impact that expanded exterior control tiles might have on unmodified interior control tiles. The expansion curtailment module 334 prevents the fill values of interior control triangles from being overwritten by a fill value from an expanded exterior control rectangle if the fill value lies outside an area occupied by the corresponding original exterior control triangle. To prevent fill-side expansion from overwriting pixels of interior control triangles, a technique based on interpolation, such as Barycentric interpolation, is implemented.

For the three vertices of an input original control triangle, the following vertex data is respectively associated therewith: (1, 0, 0), (0, 1, 0), and (0, 0, 1). These three three-dimensional (3D) coordinates can be respectively assigned in any order to the three vertices of the original control triangle. This vertex data is passed as varying variables from the geometry shader to the fragment shader. Thus, the GPU can interpolate this variable data and produce a value for every fragment generated by the rasterizer. For the pixels that lie inside the original control triangle, this variable will have a value between 0 and 1 for each of the three dimensions. For the pixels that fall outside the bounds of the original control triangle, this value will instead be outside the range [0, 1]. Thus, in the e.g. fragment shader, the expansion curtailment module 334 performs the following conditional action for a given control tile: based on a numerical test, the expansion curtailment module 334 discards any fill side values with this variable being outside the range [0, 1]. Although the values "0" and "1" are used for expansion curtailment in this example, other values may alternatively be used.

These expansion curtailment variables are associated with the three vertices of the original control triangle. After the expansion of the fourth stage 310, the surviving new vertices of the expanded control rectangle differ at least partially from the vertices of the original control triangle. Thus, these variables are applicable to the updating of the vertex data that is performed in the fifth stage 312. Accordingly, the vertex updating module 332 performs an extrapolation on these expansion curtailment variables based on the new vertices of the expanded control rectangle before sending the data to the fragment shader.

The image tuning module 336 (of FIG. 3) modifies the appearance of pixels for display based on the previous dynamic spread anti-aliasing operations. The image tuning module 336 performs the eighth stage 318 for alpha modulation of pixels and the ninth stage 320 for pixel color adjustment at subpixel zoom levels as part of e.g. a fragment shader.

In the eighth stage 318, alpha modulation is applied to at least some of the pixels encompassed by an expanded control polygon, such as the expanded control rectangle 1004. The alpha modulation is performed on pixels or fragments based on respective distances between the curve being anti-aliased and individual respective ones of the pixels provided to the fragment shader. For alpha modulation, the image tuning module 336 modifies a transparency, opaqueness, or pixel coverage of the pixels on or around the curve to smooth the appearance of the curve. For example, the relative level of transparency, opaqueness, or pixel coverage of a foreground element versus a background element can be modified as part of a composition to achieve an alpha-modulated pixel color. Generally, an amount of translucency increases as the distance from a curve increases to permit more of a background color to show through to anti-alias the appearance of the curve.

In the ninth stage 320, pixel colors are adjusted for curves that are currently in a subpixel realm based on a current zoom display level. In the subpixel zoom range for a given curve, the width of the curve is less than the size of a pixel. For subpixel zoom levels, the anti-aliasing is augmented with color modulation of the input pixel along with alpha modulation. To do so, the stroke width of the Bezier path and current zoom level at which the artwork is being rendered are provided. The stroke width is passed as per-vertex data and the zoom level is passed as a uniform variable. Other approaches may alternatively be implemented; for example, stroke width can be passed as a uniform variable. The image tuning module 336 performs the color modulation by calculating the color of a pixel based on the stroke width and the zoom level. For example, the image tuning module 336 can perform the color adjustment modulation by multiplying the pixel color with the stroke width and the zoom level.

However, this color modulation is not applied universally. For example, the stroke is to be retained even when the multiplication becomes near zero. Furthermore, the calculation is omitted if the current zoom level is not in the subpixel range. These restrictions can be implemented in a number of different manners. For instance, the multiplication factor can be clamped between thresholds of 0.25 and 1 pixel. The following example formula can be employed to implement the calculation with bounded restrictions:

$$\text{color of pixel} = \text{pixel color} * \text{clamp}(\text{zoom} * \text{strokeWidth}, \text{Lower-Bound}, \text{Upper-Bound}).$$

Thus, the image tuning module 336 can perform the color adjustment modulation by implementing this formula. Application of this formula lightens the color of a stroke that is less than one pixel in width to present the illusion of the stroke being thinner than one-pixel width. For this formula, the "pixel color" variable already includes any alpha modulation from the eighth stage 318, and the "strokeWidth" variable is provided in units of e.g. pixels. As noted above, the "Lower-Bound" variable can be set to 0.25, and the "Upper-Bound" variable can be set to 1.0; nevertheless, other values can be used. In operation, the clamp function returns the product of "zoom*strokeWidth" if the product is between the upper and lower bounds. If the product is less than the lower bound, the clamp function returns the value of the lower bound. If the product is greater than the upper bound, the clamp function returns the value of the upper bound. The ninth stage 320 can alternatively be performed in the geometry shader, in the vertex shader, or using a combination of shaders. For example, the clamped value can be computed in the geometry shader and passed on to the fragment shader for multiplication with the alpha-modulated color. The color adjustment modulation may, however, be implemented in alternative manners, including using a different formula for the subpixel range.

With regard to linear curves versus non-linear curves, a control triangle of a Bezier curve can be so narrow that the distance computation becomes numerically unstable if computed as a non-linear curve. Thus, the results can be visually superior if the distance computation is performed as if the Bezier curve is a linear curve. To address this situation, the following example threshold can be employed to determine if a Bezier curve is to be treated as a linear curve:

$$\text{curveIsLine} = (\text{dist}_{12} + \text{dist}_{23}) < (0.01 + \text{dist}_{13}).$$

For this curve versus line threshold, the "$\text{dist}_{ij}$" function is the pixel distance between the control triangle's point i and point j, the starting point of the control triangle is point 1, the terminating point is point 3, and the apex point is point 2. This thresholded flag can be computed in e.g. the geometry shader and passed on to the fragment shader. This is computationally more efficient as geometry shaders are executed once per control triangle whereas fragment shaders are executed once per pixel. The handling of narrow control triangles may, however, be realized in alternative manners, including using a different equation threshold or different values thereof.

Having discussed example details of systems, techniques, and schemes for dynamic spread anti-aliasing, consider now some example procedures to illustrate additional aspects of the techniques.

Example Procedures

Figure 14:
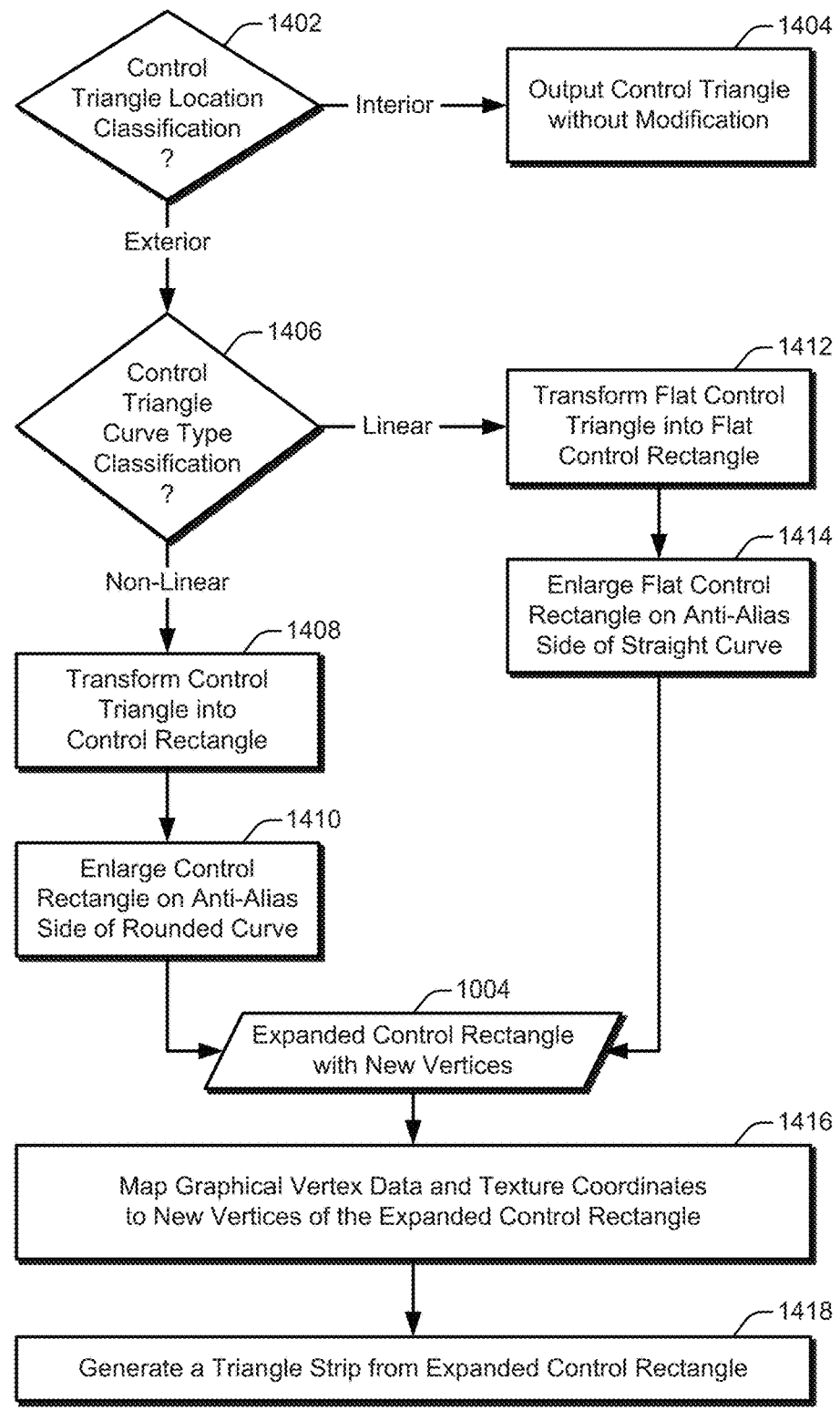
FIG. 14 is a flow chart illustrating an example procedure for dynamically spreading control triangles to enable additional pixels to be anti-aliased.
Figure 15:
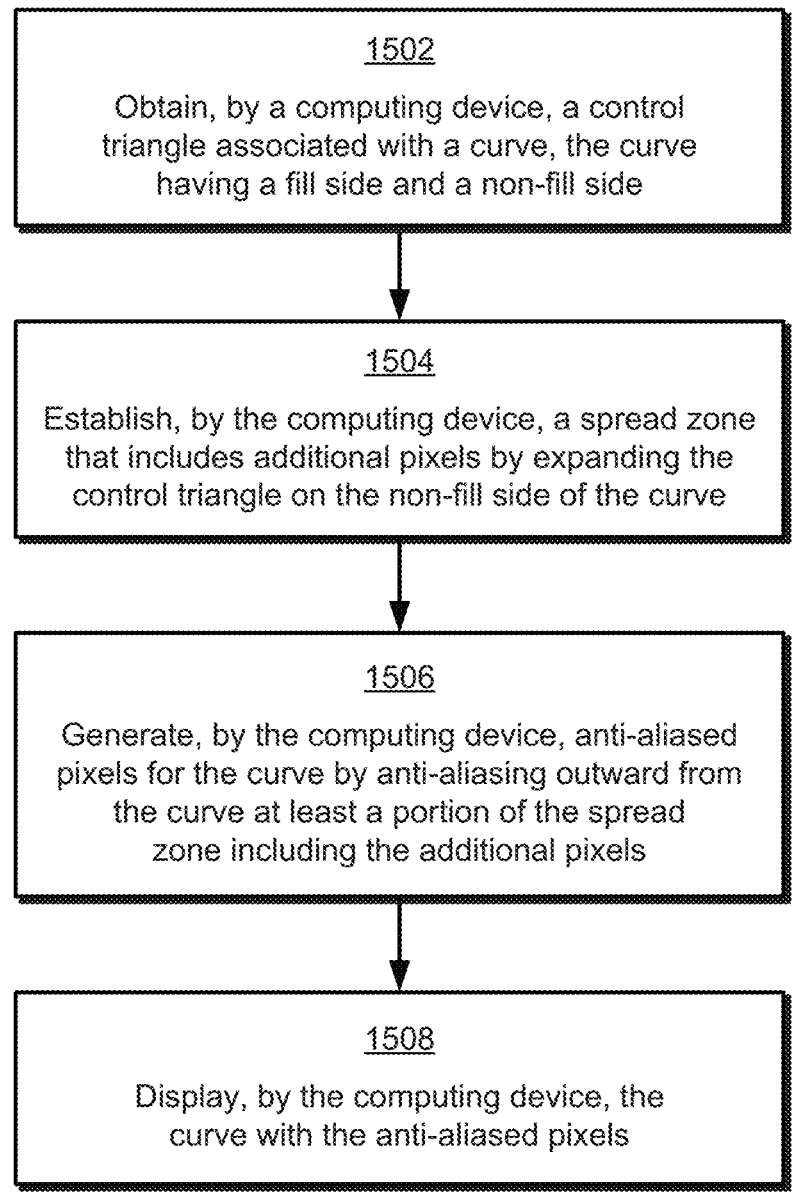
FIG. 15 is a flow diagram illustrating an example procedure in accordance with one or more example embodiments.

This section describes with reference to FIGS. 14 and 15 example procedures relating to dynamic spread anti-aliasing in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (of FIG. 1) or 1602 (of FIG. 16) using a dynamic spread anti-aliasing module 104 (e.g., of FIGS. 1, 3, and 16).

FIG. 14 is a flow chart illustrating an example procedure 1400 for dynamically spreading control triangles 504 to enable additional pixels 902 to be anti-aliased. The procedure pertains to processing a given control triangle 504 in a GPU 204 based on classification characteristics received from a CPU 202 via a corresponding triangle descriptor 512. The procedure 1400 includes operations 1402-1418 and can be performed in e.g. a geometry shader. At operation 1402, an expansion module 326 ascertains a location classification 514 of the control triangle 504. If the classification 514 is an interior location, then at operation 1404 the control triangle 504 is output without a modification being made that is related to anti-aliasing. The interior control triangle 504 can be output unchanged from the geometry shader. On the other hand, if the classification 514 is an exterior location, then at operation 1406 the expansion module 326 determines a curve type classification 514 of the control triangle 504.

If the curve type classification 514 is non-linear, then at operation 1408 a transformation module 328 transforms the control triangle 504 into a control rectangle 904. At operation 1410, an enlargement module 330 enlarges the control rectangle 904 on an anti-alias side of a rounded curve. For example, the edge containing the original control triangle's base is extended outward for concave side anti-aliasing, and the edge containing the original control triangle's apex point is extended outward for convex side anti-aliasing. This enlargement creates an expanded control rectangle 1004 having new vertices 1006. On the other hand, if the curve type classification 514 is linear, then at operation 1412 the transformation module 328 transforms a flat control triangle 504 into a flat control rectangle 904. At operation 1414, the enlargement module 330 enlarges the flat control rectangle 904 on an anti-alias side of a straight curve. This enlargement creates an expanded control rectangle 1004 having new vertices 1006 with the expanded control rectangle 1004 being a few pixels wide (e.g., 1-5 pixels wide).

At operation 1416, a vertex updating module 332 maps vertex data and texture coordinates to the new vertices 1006 of the expanded control rectangle 1004. For vertex data that is destined for Barycentric interpolation (e.g., in the fragment shader), an extrapolation is performed to find corresponding values at the new vertices. This extrapolation ensures that when hardware performs Bezier interpolation (e.g., in the fragment shader), the Bezier interpolation computes the same results at any given pixel as would have been computed without the pixel spread created by the expansion module 326. For vertex data that was originally computed in the vertex shader, the same calculations are repeated in the geometry shader. At operation 1418, the dynamic spread anti-aliasing module 104 generates a triangle strip 1008 based on the expanded control rectangle 1004 and the new vertices 1006. The triangle strip 1008 and four new vertices 1006 are output from the geometry shader.

FIG. 15 is a flow diagram that includes four blocks 1502-1508 and that illustrates an example procedure 1500 for dynamic spread anti-aliasing in accordance with one or more example embodiments. At block 1502, a control triangle that is associated with a curve is obtained, with the curve having a fill side and a non-fill side. For example, a computing device 102 can obtain a control triangle 504 that is associated with a curve 502, with the curve 502 having a fill side and a non-fill side. A GPU 204 may receive the control triangle 504 from a CPU 202 along with a triangle descriptor 512 that includes a classification 514 indicative of a non-anti-alias side or an anti-alias side of a non-linear Bezier curve.

At block 1504, a spread zone that includes additional pixels is established by expanding the control triangle on the non-fill side of the curve. For example, the computing device 102 can establish a spread zone 906 that includes additional pixels 902 by expanding the control triangle 504 on the non-fill side of the curve 502. To do so, an expansion module 326 may transform the control triangle 504 into a larger polygon, or the expansion module 326 may enlarge the triangle or the larger polygon by extending an edge thereof outward from the curve 502 on the anti-alias side of the curve 502. The expansion increases the locus of points encompassed by the control polygon to establish the spread zone 906, with newly-encompassed points including the additional pixels 902.

At block 1506, anti-aliased pixels are generated for the curve by anti-aliasing outward from the curve at least a portion of the spread zone including the additional pixels. For example, the computing device 102 can generate anti-aliased pixels for the curve 502 by anti-aliasing outward and away from the curve 502 at least a portion of the spread zone 906, with the portion including the additional pixels 902. For instance, an image tuning module 336 may apply alpha modulation to at least some of the pixels newly encompassed as a result of the control polygon expansion. The alpha modulation adjusts a transparency value of pixels with respect to an underlying background color based on respective distances between the pixels and the curve.

At block 1508, the curve is displayed with the anti-aliased pixels. For example, the computing device 102 can display the curve 502 with the anti-aliased pixels. A smoother-appearing version of the curve 502 may be presented on an integrated or a separate display screen at any of various zoom display levels.

Having described example procedures in accordance with one or more embodiments, consider now an example system and device that can be utilized to implement the various schemes and techniques described herein.

Example System and Device

Figure 16:
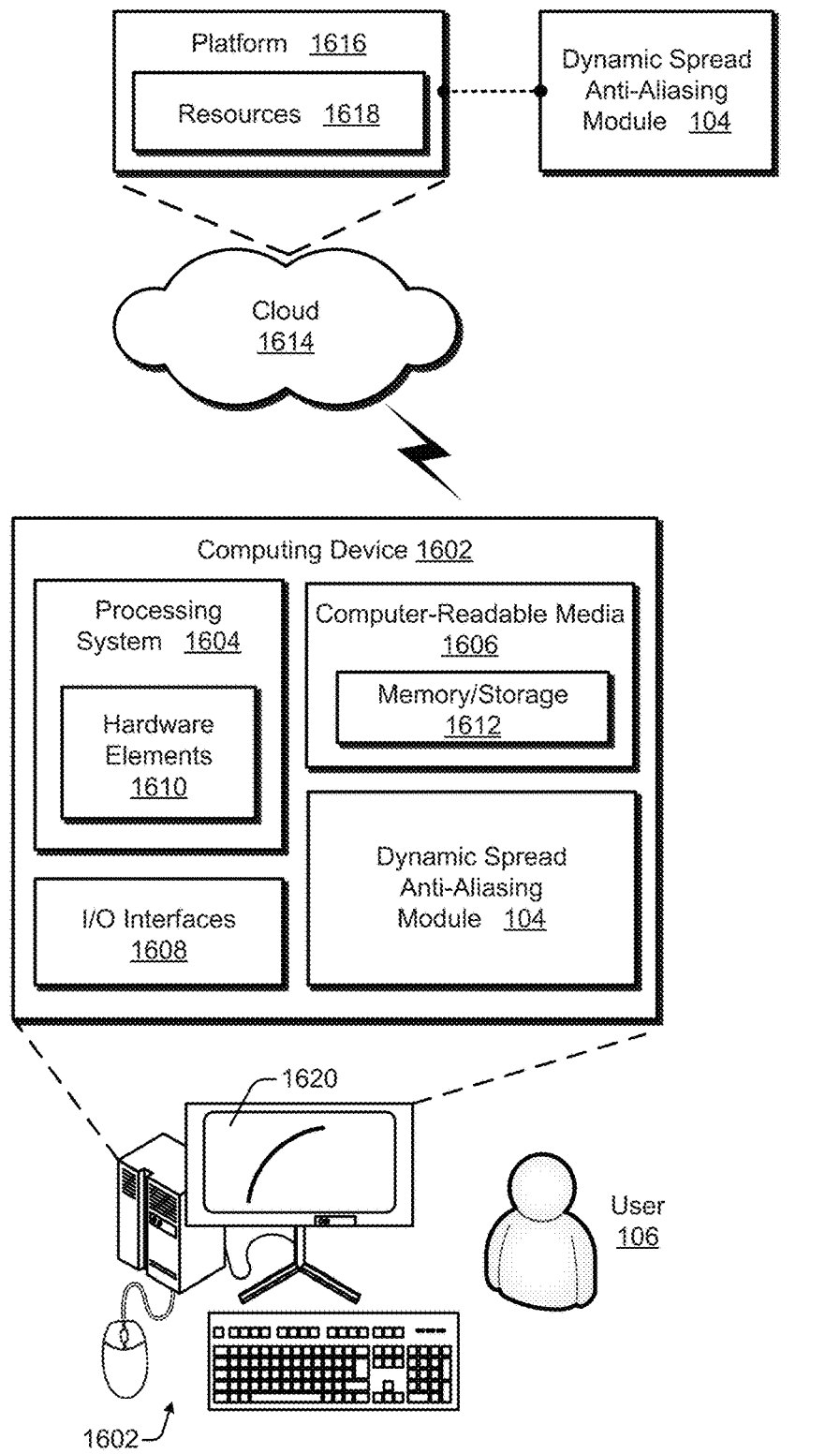
FIG. 16 illustrates an example system including various components of example devices that can be employed for one or more embodiments of dynamic spread anti-aliasing.

FIG. 16 illustrates generally at 1600 an example system including an example computing device 1602 representative of one or more computing systems or computing devices that may implement the various techniques described herein. This is depicted through the inclusion of a dynamic spread anti-aliasing module 104, which may operate as described herein above. A computing device 1602 may be implemented as, for example, a computing device 102 (of FIG. 1) in an independent or standalone mode. The computing device 1602 can display one or more anti-aliased images to the user 106 via a display screen 1620. Generally, a computing device 1602 may be implemented as, for example, an end-user device (e.g., a smart phone or desktop computer) of a user 106, a corporate device (e.g., a server side device or data center hardware), an on-chip system or system-on-a-chip (SOC) (e.g., that is integrated with a tablet or image display device), or any other suitable computing device or computing system.

In an example embodiment as shown in FIG. 1, the dynamic spread anti-aliasing module 104 is executing at one location (e.g., within a housing of the computing device 102). However, the dynamic spread anti-aliasing module 104 can alternatively be executing in the cloud (e.g., on a network-side computing device) if bandwidth is sufficiently large or transmission latency is sufficiently small, and such an example embodiment as also shown in FIG. 16. Alternatively, a portion of the dynamic spread anti-aliasing module 104 can be executing at both a client-side computing device and a server-side computing device. In such an embodiment, the operations implemented by the dynamic spread anti-aliasing module 104 as described herein may be distributed across a client-server architecture.

The example computing device 1602 as illustrated includes at least one processing system 1604, one or more computer-readable media 1606, and one or more I/O interfaces 1608 that may be communicatively coupled, one to another. Although not explicitly shown, the computing device 1602 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including one or more hardware elements 1610 that may be implemented as processors, functional blocks, and so forth. This may include implementation in hardware as an application specific integrated circuit (ASIC), a general-purpose processor, or other logic device formed using e.g. one or more semiconductors. The hardware elements 1610 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (e.g., random access memory (RAM)) or nonvolatile media (e.g., read only memory (ROM), flash memory, optical discs, or magnetic disks). The memory/storage component 1612 may include fixed media (e.g., RAM, ROM, or a fixed hard drive) or removable media (e.g., a flash memory card, a removable hard drive, or an optical disc). The computer-readable media 1606 may be implemented in a variety of other ways as further described below.

The input/output interface(s) 1608 are representative of functionality to allow a user to enter commands or information to computing device 1602 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1602 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1606 may include a variety of media that may be accessed by the computing device 1602. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1602, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct-wired connection, or wireless media, such as acoustic, RF, microwave, infrared, or other wireless media.

As previously described, hardware elements 1610 or computer-readable media 1606 may be representative of modules, programmable device logic, fixed device logic, a combination thereof, and so forth that are implemented in a hardware form that may be employed in some embodiments to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1610. The computing device 1602 may be configured to implement particular instructions or functions corresponding to software or hardware modules. Accordingly, implementation of a module that is executable by the computing device 1602 as software may be achieved at least partially in hardware, e.g., through use of computer-readable storage media or the hardware elements 1610 of the processing system 1604. The instructions or functions may be executable/operable by one or more articles of manufacture (e.g., one or more computing devices 1602 or processing systems 1604) to implement techniques, modules, or examples described herein.

The techniques described herein may be supported by various configurations of the computing device 1602 and are not limited to the specific aspects of the example devices described herein. This functionality may also be implemented fully or partially through use of a distributed system, such as over a "cloud" 1614 via a platform 1616 as described below.

The cloud 1614 may include or represent a platform 1616 for resources 1618. The platform 1616 abstracts underlying functionality of hardware (e.g., one or more servers or at least one data center) and software resources of the cloud 1614. The resources 1618 may include applications or data that can be utilized while computer processing is at least partially executed on servers remote from, or distributed around, the computing device 1602. Resources 1618 may also include services provided over the Internet or through a subscriber network, such as a cellular or Wi-Fi network.

The platform 1616 may abstract resources and functions to connect the computing device 1602 with other computing devices or services. The platform 1616 may also serve to abstract a scaling of resources to provide a corresponding level of scale to encountered demand for the resources 1618 implemented via the platform 1616. Accordingly, in an interconnected device embodiment, implementation of functionality described herein may be distributed throughout the illustrated system of FIG. 16, or at least throughout the cloud 1614 along with the computing device 1602. For example, functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide images with a smoother, less-jagged appearance using single-sampled anti-aliasing of curves, a method implemented by a computing device, the method comprising:
    obtaining, by the computing device, a control triangle associated with a curve corresponding to at least some pixels of a digital image, the curve having a fill side and a non-fill side;
    establishing, by the computing device, a spread zone that includes the control triangle and additional pixels by expanding an edge of the spread zone outward beyond a vertex of the control triangle on the non-fill side of the curve;
    preventing, by the computing device, a respective fill value of at least one pixel of an interior triangle associated with the curve from being overwritten by the respective fill value of at least one of the additional pixels of the spread zone having the control triangle by discarding the respective fill value of the at least one additional pixel in response to determining that the at least one additional pixel is outside bounds of the control triangle;
    generating, by the computing device, anti-aliased pixels for the curve by modifying transparency values of a plurality of the additional pixels included in the spread zone, wherein a respective transparency value of each pixel of the plurality of additional pixels is modified relative to a distance from the curve; and
    displaying, by the computing device, the curve with the anti-aliased pixels.

2. The method as described in claim 1, wherein:
    the curve comprises a quadratic Bezier curve; and
    the obtaining comprises:
        obtaining three vertices of the control triangle; and
        obtaining a triangle classification indicative of a type of the curve and a side of the curve to anti-alias.

3. The method as described in claim 1, wherein the expanding comprises transforming the control triangle into a control rectangle.

4. The method as described in claim 3, wherein the control triangle comprises a flat control triangle having a zero area, the curve comprises a linear curve, and the control rectangle has a non-zero area.

5. The method as described in claim 3, wherein the expanding comprises enlarging the control rectangle to increase an area of the control rectangle.

6. The method as described in claim 5, wherein the enlarging comprises extending an edge of the control rectangle outward on the non-fill side of the curve.

7. The method as described in claim 6, wherein the extending comprises extending the edge of the control rectangle outward between one and five pixels.

8. The method as described in claim 1, further comprising:
    determining that a width of the curve is less than one pixel at a current zoom level; and
    adjusting a color value of at least one pixel of the plurality of additional pixels based on the width of the curve and the current zoom level.

9. The method as described in claim 1, wherein the curve comprises a Bezier curve forming a part of a filled Bezier path, and the method further comprises:
    tessellating, by the computing device, the filled Bezier path to produce multiple triangles, the multiple triangles including multiple interior triangles and multiple exterior control triangles, the multiple exterior control triangles including the control triangle; and preventing, by the computing device, the spread zone that results from expansion of the control triangle from overwriting pixels of one or more interior triangles that are adjacent to the control triangle.

10. The method as described in claim 1, wherein the curve is displayed with a stroke width of at least one pixel, and wherein the method further comprises:

responsive to displaying the curve with the anti-aliased pixels, receiving an indication that a current zoom display level is increased causing the stroke width of the curve to be less than one pixel; and responsive to receiving the indication, adjusting a color value of individual pixels corresponding to a portion of the curve that is displayed at the current zoom display level based on the current zoom display level and the stroke width of the curve effective to display the portion of the curve with an anti-aliased appearance without further anti-aliasing the individual pixels.

11. At least one computing device operative in a digital medium environment to provide images with a smoother, less-jagged appearance using single-sampled anti-aliasing of curves, the at least one computing device comprising:

a processing system and at least one computer-readable storage medium including:

a tessellation module configured to tessellate a filled Bezier path to produce multiple interior tessellated tiles and multiple exterior control tiles corresponding to pixels of an image and to generate control tile descriptors for the exterior control tiles;

an expansion module configured to expand the multiple exterior control tiles based on the control tile descriptors to produce multiple expanded control tiles including additional pixels by extending an edge for each of the multiple expanded control tiles outward beyond a vertex of the multiple exterior control tiles on a non-fill side of and away from a corresponding curve of each of the multiple exterior control tiles without extending another edge on a fill side for the corresponding curve of the multiple exterior control tiles;

an expansion curtailment module configured to prevent a respective fill value of at least one of the pixels of an interior tessellated tile from being overwritten by the respective fill value of at least one of the additional pixels of an adjacent expanded control tile by discarding the respective fill value of the at least one additional pixel in response to determining that the at least one additional pixel is outside bounds of an exterior control tile on which the adjacent expanded control tile is based;

an image tuning module configured to perform alpha modulation on the additional pixels of the multiple expanded control tiles to produce anti-aliased pixels for each of the multiple exterior control tiles; and an image display module configured to display:
the anti-aliased pixels for the corresponding curve; and
the pixels of the multiple interior tessellated and expanded control tiles with the respective fill value.

12. The computing device as described in claim 11, wherein:

the multiple exterior control tiles comprise multiple control triangles, and the multiple expanded control tiles comprise multiple control rectangles;

the expansion module includes:
a transformation module configured to transform the multiple control triangles into the multiple control rectangles; and an enlargement module configured to extend an edge of each of the multiple control rectangles; and the multiple expanded control tiles comprise the multiple control rectangles with a respective extended edge.

13. The computing device as described in claim 11, wherein a respective control tile descriptor of each exterior control tile comprises coordinates for each vertex of the exterior control tile and a classification indicative of a curve type and a curve side to anti-alias.

14. The computing device as described in claim 11, wherein the image tuning module is further configured to adjust a color value of the additional pixels based on a sub-pixel display range, a current zoom level, and a stroke width of the curve.

15. The computing device as described in claim 11, wherein the image tuning module is further configured to perform a relative level of said alpha modulation on the additional pixels based on respective distances to the corresponding curve.

16. At least one computing device operative in a digital medium environment to provide images with a smoother, less-jagged appearance using single-sampled anti-aliasing of curves, the at least one computing device configured to perform operations comprising:

determining a curve type classification of a control triangle corresponding to a curve, the control triangle including graphical attribute values associated with vertices of the control triangle;

responsive to a determination that the control triangle has a non-linear curve type:
transforming the control triangle into a control rectangle; and
creating an enlarged control rectangle having two vertices co-positioned with the control rectangle and two new vertices outside the control rectangle by enlarging an edge of the control rectangle outward beyond a vertex of the control rectangle on an anti-alias side of the curve without enlarging the control rectangle on a side of the curve opposite the anti-alias side;

responsive to a determination that the control triangle has a linear curve type and that the control triangle comprises a flat control triangle:
transforming the flat control triangle into a flat control rectangle; and
creating an enlarged control rectangle having two vertices co-positioned with the flat control rectangle and two new vertices outside the flat control rectangle by enlarging an edge of the flat control rectangle on the anti-alias side of the curve without expanding the flat control rectangle on the side of the curve opposite the anti-alias side;

generating updated graphical attribute values associated with the two new vertices of the enlarged control rectangle by extrapolating the updated graphical attribute values from respective graphical attribute values associated with the vertices of the control triangle;

generating a triangle strip based on the enlarged control rectangle; and displaying the curve in an anti-aliased form based on the triangle strip and the updated graphical attribute values.

17. The computing device as described in claim 16, wherein:

the curve comprises a Bezier curve with a concave-side fill; and creating the enlarged control rectangle comprises extending an the edge of the control rectangle that corresponds to an apex of the control triangle away from the Bezier curve.

18. The computing device as described in claim 16, wherein:
   the curve comprises a Bezier curve with a convex-side fill; and
   creating the enlarged control rectangle comprises extending an the edge of the control rectangle that corresponds to a base of the control triangle away from the Bezier curve.

19. The computing device as described in claim 16, wherein the operations further comprise
   preparing graphics data for anti-aliasing on quadratic filled Bezier paths, including:
      converting cubic Bezier paths to quadratic Bezier paths that are formed from multiple quadratic Bezier curves; and
      converting stroked Bezier paths to filled Bezier paths; and
      tessellating the filled Bezier paths to produce a plurality of control triangles including the control triangle corresponding to the curve.

20. The computing device as described in claim 16, wherein the operations further comprise:
   applying anti-aliasing to multiple pixels of the triangle strip using alpha modulation based on respective distances to the curve; and
   adjusting a color value of individual pixels of the multiple pixels based on a current zoom level for the displaying.

\* \* \* \* \*